US00RE50180E

(19) United States
(12) Reissued Patent
Abou-Sayed et al.

(10) Patent Number: US RE50,180 E
(45) Date of Reissued Patent: Oct. 22, 2024

(54) QUANTIFYING A RESERVOIR VOLUME AND PUMP PRESSURE LIMIT

(71) Applicant: Advantek International Corporation, Houston, TX (US)

(72) Inventors: Ahmed S. Abou-Sayed, Houston, TX (US); Mehdi Loloi, Houston, TX (US); Omar Abou-Sayed, Houston, TX (US); Gareth Block, Houston, TX (US); Ali Zidane, Houston, TX (US)

(73) Assignee: Advantek International Corporation, Houston, TX (US)

(21) Appl. No.: 17/686,363

(22) Filed: Mar. 3, 2022

Related U.S. Patent Documents

Reissue of:
(64) Patent No.: 10,578,766
Issued: Mar. 3, 2020
Appl. No.: 14/452,525
Filed: Aug. 5, 2014

U.S. Applications:
(60) Provisional application No. 62/010,911, filed on Jun. 11, 2014.

(51) Int. Cl.
*G01V 99/00* (2024.01)
*G06F 17/14* (2006.01)

(52) U.S. Cl.
CPC ..... *G01V 99/00* (2013.01); *G06F 17/14* (2013.01); *G01V 2210/646* (2013.01)

(58) Field of Classification Search
CPC ... G01V 99/00; G01V 2210/646; G06F 17/14
See application file for complete search history.

(56) References Cited

U.S. PATENT DOCUMENTS 5,431,236 A 7/1995 Warren
5,589,603 A 12/1996 Alexander
6,321,860 B1 11/2001 Reddoch
6,640,912 B2 11/2003 Reddoch
7,054,751 B2 * 5/2006 Craig ..... E21B 49/008 702/13

(Continued)

FOREIGN PATENT DOCUMENTS

WO 2009006526 A2 1/2009
WO WO-2015191927 A1 * 12/2015 ..... E21B 43/26
WO WO-2016004137 A1 * 1/2016 ..... B65G 5/00

OTHER PUBLICATIONS

Craig, D.P. and T.A. Blasingame "Application of a New Fracture-Injection/Falloff Model Accounting for Propagating, Dilated, and Closing Hydraulic Fractures", 2006 SPE Gas Technology Symposium, SPE 100578, May 15-17, 2006. (Year: 2006).*

Zakaria, A.S., et al. "Application of Genetic Algorithms to the Optimization of Pressure Transient Analysis of Water Injectors using Type Curves", SPE European Formation Damage Conference, SPE 143386, Jun. 7-10, 2011. (Year: 2011).*

International Search Report and Written Opinion, PCT/US2015/035433, dated Aug. 31, 2015, 8 pages.

(Continued)

*Primary Examiner* — Luke S Wassum
(74) *Attorney, Agent, or Firm* — Peter V. Schroeder; Booth Albanesi Schroeder PLLC

(57) ABSTRACT

Methods for computer modelling of a pressure transient behavior after shut-in and during fall-off of an injection event are provided to provide estimates of stimulated reservoir volume, formation permeability, stress contrast across the target and adjacent zones, fracture dimensions, fracture beyond the target zone, and pump pressure limits for maintaining fractures within the target zone, especially in fractured tight reservoirs.

29 Claims, 13 Drawing Sheets

(56) References Cited

U.S. PATENT DOCUMENTS

| | | | | |
|---|---|---|---|---|
| 7,272,973 | B2 * | 9/2007 | Craig | E21B 49/008 73/861 |
| 7,389,185 | B2 * | 6/2008 | Craig | E21B 49/008 702/13 |
| 7,478,020 | B2 | 1/2009 | Guo | |
| 7,721,594 | B2 | 5/2010 | Rogers | |
| 7,730,966 | B2 | 6/2010 | Fragachan | |
| 8,047,284 | B2 * | 11/2011 | Ramurthy | E21B 49/006 73/152.38 |
| 8,165,816 | B2 | 4/2012 | Searles | |
| 8,271,243 | B2 | 9/2012 | Koutsabeloulis | |
| 8,392,165 | B2 | 3/2013 | Craig | |
| 8,571,843 | B2 | 10/2013 | Weng | |
| 8,731,890 | B2 | 5/2014 | Fragachan | |
| 8,794,316 | B2 * | 8/2014 | Craig | E21B 43/26 166/250.01 |
| 8,812,236 | B1 | 8/2014 | Freeman | |
| 8,855,986 | B2 | 10/2014 | Castellini | |
| 9,176,250 | B2 * | 11/2015 | Sinha | E21B 47/107 |
| 9,228,425 | B2 | 1/2016 | Ganguly | |
| 9,556,729 | B2 * | 1/2017 | Lamei | G01N 15/08 |
| 9,725,987 | B2 | 8/2017 | Wutherich et al. | |
| 10,241,232 | B2 | 3/2019 | Lin | |
| 10,578,766 | B2 * | 3/2020 | Abou-Sayed | G01V 99/00 |
| 11,333,792 | B1 * | 5/2022 | Lemons | G01V 99/005 |
| 2005/0203723 | A1 | 9/2005 | Geehan | |
| 2005/0216198 | A1 | 9/2005 | Craig | |
| 2007/0079652 | A1 | 4/2007 | Craig | |
| 2007/0083331 | A1 * | 4/2007 | Craig | E21B 49/008 702/13 |
| 2008/0083566 | A1 | 4/2008 | Burnett | |
| 2008/0162094 | A1 | 7/2008 | Geehan | |
| 2010/0218941 | A1 * | 9/2010 | Ramurthy | E21B 43/26 166/250.1 |
| 2010/0314104 | A1 | 12/2010 | Shokanov et al. | |
| 2011/0040536 | A1 * | 2/2011 | Levitan | F21B 49/00 703/2 |
| 2011/0209868 | A1 | 9/2011 | Dusterhoft et al. | E21B 43/114 166/250.1 |
| 2011/0247804 | A1 | 10/2011 | Woolsey | |
| 2012/0158310 | A1 | 6/2012 | Adams et al. | E21B 47/06 702/12 |
| 2012/0217008 | A1 | 8/2012 | Moos | |
| 2012/0325472 | A1 * | 12/2012 | Litvinets | C09K 8/665 166/280.1 |
| 2013/0341030 | A1 | 12/2013 | Brannon | |
| 2014/0122047 | A1 | 5/2014 | Saldivar | E21B 44/00 703/10 |
| 2014/0182844 | A1 * | 7/2014 | Wutherich | E21B 49/006 166/250.1 |
| 2014/0238668 | A1 * | 8/2014 | Bittleston | E21B 43/26 166/250.01 |
| 2023/0272204 | A1 * | 8/2023 | Tsujimoto | C08L 33/12 526/318.3 |

OTHER PUBLICATIONS

ARMA 10-397, Geomechanical Modeling Techniques Applied to Wate Injection Process, J. Ronderos, 2010.

ARMA 14/7759, A noel technique for assessment of fracture geometry and injection domain from falloff tests after fractured injection of slurry, M. Loloi.

ARMA/NARMS 04-547, Leak-Off Test Interpretation and Modeling with Application to Geomechanics, D. Lee, 2004.

ARMA/USRMS 05-676, Abou-Sayed, A.S., A geomechanics update on Alaska's GNI project, 2005.

IADC SPE 72308, Design Considerations in Drill Cuttings Re-Injection Through Downhole Fracturing, A. Abou-Sayed, 2001.

J. of Petroleum Technology, Improved Methods to Determine Hydraulic Fracture Height, T.A. Dobkins, 1981.

Oilfield Review, The Cutting Edge in Drilling-Waste Management, T. Geehan, 2006.

SPE 102304, Application of New Fall-Off Tst Interpretation Methodology to Fractured Water Injection Wells Offshore Sakhalin, P.J van den Hoek, 2006.

SPE 106043 Weng, X., Effect of Production-Induced Stress Field on Refracture Propogation and Pressure Response, 2007.

SPE 107561, Real-Time Simulation in Grid Environments: Communicating Data from Sensors to Scientific Simulations, R. Duff, 2007.

SPE 109876, Real-Time Performance Analysis of Water-Injection Wells, B. Izgec, 2007.

SPE 114148, Subsurface Drilling Waste Injection: Real-Time Waste Domain Characterization Using Injection Monitoring and Pressure Interpretation, T. Shokanov, 2008.

SPE 140136, Evaluation of After-Closure Analysis Techniques for Tight and Shale Gas Formations, I.M. Mohamed 2011.

SPE 143386, Application of Genetic Algorithms to the Optiization of Pressure Transient Analysis of Water Injectors Using Type Curves, A. Zakaria, 2011.

SPE 187234-MS, Guo, Y., Injection and Remote Real-Time Monitoring, 2017.

SPE 18804, Injection-Time Effects on Falloff Responses From Composite Reservoirs, A.K. Ambastha, 1990.

SPE 36331, Real-Time Treatment Optimization, A.M. Acock, 1996.

SPE 64789, Gu, H., Computer Simulation Multilayer Hydraulic Fractures, 2000.

SPE 77946, Pressure Transient Analysis in Fractured Produced Water Injection Wells, P.J. van den Hoek, 2002.

SPE Reservoir Evaluation & Egr'g., Dimensions and Degree Containment of Waterflood-Induced Fractures from Pressure Transient Analysis, P.J. van den Hoek 2005.

SPE/IADC 79804 Ultimate Capacity of a Disposal Well in Drilling Waste Injection Operations, Ahmed Abou-Sayed, et al. 2003.

SPE14458, Fractured Water-Injection Wells A Pressure Falloff Test for Determining Fracture Dimensions, E.J. Koning 1985.

* cited by examiner

QUANTIFYING A RESERVOIR VOLUME AND PUMP PRESSURE LIMIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This is a U.S. Non-Provisional application claiming priority to U.S. Provisional Application No. 61/862,474, filed Aug. 5, 2013, and 62/010,911, filed Jun. 12, 2014.

TECHNICAL FIELD

The present disclosure relates to the oil and gas industry, in particular, to subterranean reservoir measurement and use. More particularly, the disclosure relates to computer modelling of pressure transient behavior after shut-in and during fall-off of an injection event to provide estimates of stimulated reservoir volume, formation permeability, stress contrast across the target and adjacent zones, fracture dimensions, fracture beyond the target zone, and pump pressure limits for maintaining fractures within the target zone, especially in fractured tight reservoirs.

BACKGROUND

Hydraulic fracturing of subterranean zones to enhance recovery of hydrocarbons is now common practice in the oil and gas industry. It has become increasingly important to estimate or discover the various properties of the targeted fracture zones, both prior to and after fracture injection. Further, hydraulic fracturing often results in massive amounts of waste-water which needs to be disposed. The waste-water can contain fracturing, stimulation, and other treatment fluids, sand, fines, and other solids from the fractured zone, excess proppant, water, brine, hydrocarbons and other components. One method of disposing of the waste-water is injection into a subterranean zone of a disposal well. Disposal can include fracturing, or re-fracturing, of the disposal well subterranean zones. As with production wells, it is useful to know or estimate various zonal properties which effect the effective reservoir volume, containment of the injected fluids, and fracture behavior after injection.

To discover such properties and behaviors, it is known in the industry to perform injection tests or other pressure tests. Such a test consists of injecting, by pumping from the surface, at a known or measured pump pressure, an injection fluid of known properties and volume into a targeted fracture zone of the reservoir. A common test is a fall-off test, in which injection is stopped and the ensuing pressure decline is measured against time. In some reservoirs, formation pressure is high enough to maintain a column of fluid in the wellbore and pressure can be monitored at the surface. Bottom-hole pressure is calculated using fluid column weight and surface pressure. Gas-injection wells and water flooding lend themselves to fall-off testing, for example. Pressure increase over time during injection can be used but is rare. The measured and calculated data is used to create pressure transient curves or plots. The equations and theory for these tests are similar to those for build-up and drawdown testing. Pressure of the zone is measured using typical techniques and equipment, such as downhole pressure sensors and communication equipment.

Standard pressure transient curve analysis has been previously used to calculate reservoir volume. However, such efforts yield no information regarding existing fractures or their behavior, shrinkage, closure, etc. The tests typically use data derived by producing a measured amount of fluid from a pressurized reservoir and observing the resultant pressure drop. Production is stopped and pressure rise is observed. By assuming certain fluid properties, an estimation of the volume of the reservoir is made by relating pressure response to produced volumes. Conventional methodologies do not provide details about closing and shrinking fractures, reservoir mobility in the surrounding rocks, or stresses in reservoir boundary layers which act to confine the propagation of the fractures during pumping.

Certain more tailored pressure transient analysis methods have been developed specifically for long-term water-injection operations. These tailored methods interpret pressure data gathered during a water injection operation, and upon its cessation, to provide certain information about size of the injection reservoir, fractures created during injection, and the extent of the water-injection horizon within the reservoir. These tailored pressure transient analysis methods for water injection operations, however, assume that the hydraulic fracture closes abruptly and does not shrink in either length or height. In reality, the fractures close more slowly and often shrink in either or both length and height, all of which alters the transient pressure response when the operation is stopped. Moreover, these tailored methods do not apply to injection and fracturing operations except long-term water-injection operations.

Another common method for estimating stimulated reservoir volume is seismic mapping. Monitored seismic signals generated by natural reservoir rock movements (passive seismic signals or micro-seismic signals) and/or seismic signals during or after fracturing are observed and recorded using a number of sensitive seismic wave receivers positioned in and about the well. These micro-seismic events are "mapped" in a virtual three-dimensional space, and the size of the created fracture network, which in very low permeability formations such as shale formations is roughly equivalent to the effective or stimulated reservoir volume, is approximated as the volume of the micro-seismic event-cloud.

Unfortunately, these methodologies do not provide details about closing and shrinking fractures, reservoir mobility in the surrounding rocks, and stress contrasts between the fractured zone and reservoir boundary layers which act to confine the propagation of the fractures during pumping. Such information would be useful in determining, among other things, a maximum pump pressure for injection to insure containment of fractures to a target zone and the degree of fracture extension beyond the target zone.

BRIEF DESCRIPTION OF THE DRAWING

For a more complete understanding of the features and advantages of the present disclosure, reference is now made to the detailed description of the disclosure along with the accompanying figures in which corresponding numerals in the different figures refer to corresponding parts and in which.

DETAILED DESCRIPTION

Figure 1:
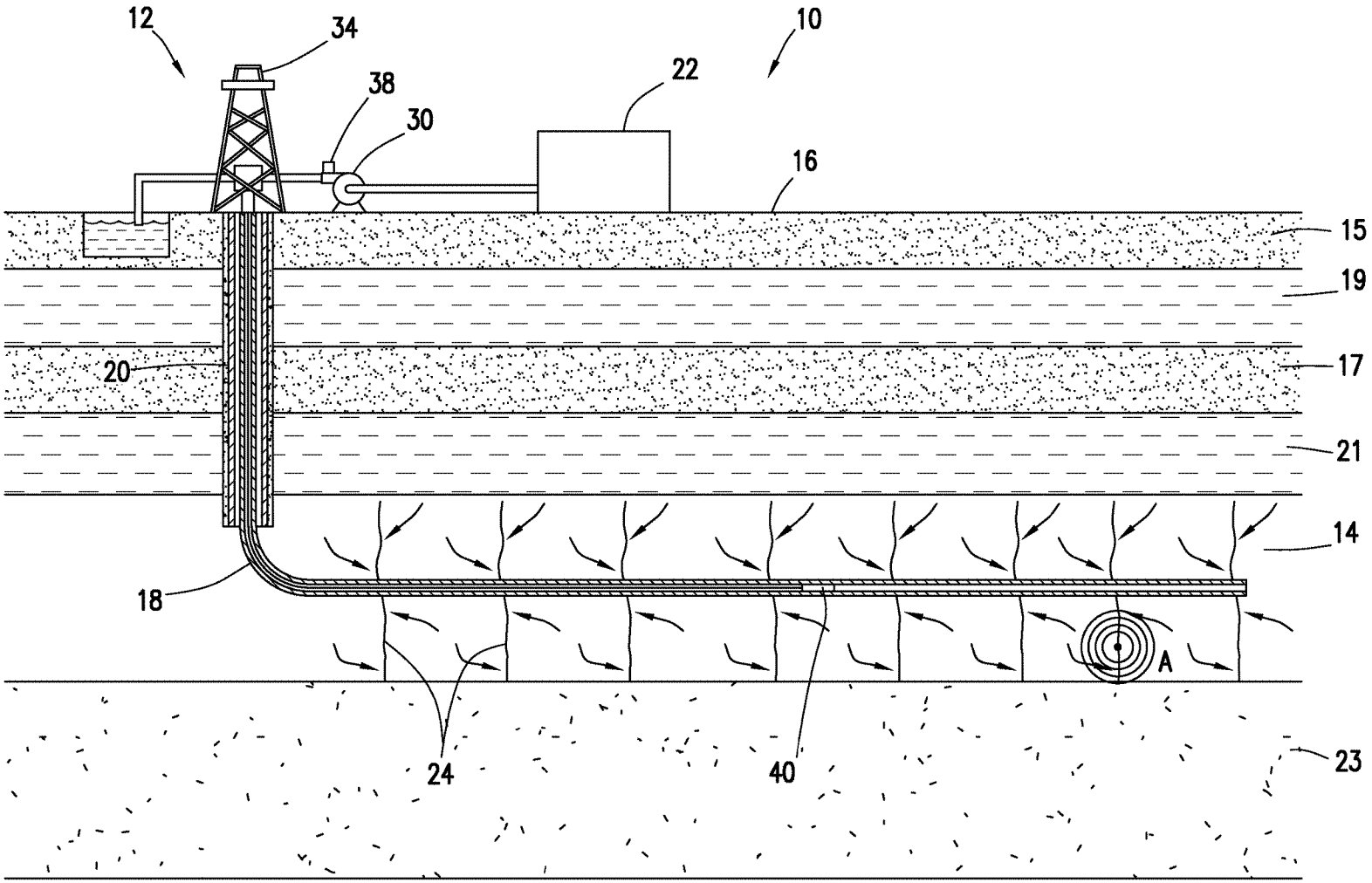
FIG. 1 is a schematic of an exemplary onshore oil or gas drilling rig and wellbore, in cross-section, according to an aspect of the invention.

The present disclosures and disclosures are described by reference to drawings showing one or more examples of how the disclosures can be made and used. In these drawings, reference characters are used throughout the several views to indicate like or corresponding parts. In the description which follows, like or corresponding parts are marked throughout the specification and drawings with the same reference numerals, respectively. Drawing is not to scale.

The present disclosure provides a method to quantitatively estimate the volume of a reservoir stimulated by hydraulic fracturing and a pump pressure limit to assure fracture containment using computational simulation based analysis of pressure transients and their derivatives during and after an injection event. The methods disclosed herein provide a more realistic and accurate estimation of reservoir and fracture parameters through computational simulation based analyses of pressure transients and their derivatives during a pressure fall-off following an injection operation which involves hydraulic fracturing in a well. The disclosure provides a realistic lower bound estimate of the stimulated reservoir volume for reservoirs where the increase in the inner zone permeability, transmissibility, or mobility is primarily due to hydraulic fracturing (such as with gas production from fractured shale). The disclosure will also provide information about the dimensions of the hydraulic fractures, whether created by the operation or pre-existing fractures activated by the operation, and the stress contrasts between injection and containment layers. The disclosure will correctly interpret the closing and shrinking (in length and or height) fracture signature. The disclosure will correctly identify the conductivity of the fracture. The disclosure will also determine the degree of the containment of the main hydraulic fracture to enable the operator to use fracture conditions which assure the containment of the fracture and the injected fluid used to create the fracture within the target zone. The fracture created in a well can be used for enhancing the productivity of the well, sequestration of solid waste, or injection of fluid for disposal or reservoir pressure support. The disclosure will be executed using a software program to simulate input parameters which control the shape of type-curves of pressure response and its derivative and to match these resultant type-curves to the actual field derived data. The software program will operate on processor based computational system. The software program will use a genetic algorithm or optimization technique to facilitate the rapid simulation of many input parameters to make the type curve match. The software program will use pressure transient data in real-time as it is acquired or after the fact. The data will be stored on physical media readable by the computer upon which the software is installed or can be stored on a different computer and the software can read the data over a network or via the internet.

The current disclosure is a technique for estimating fracture and reservoir characteristics of injection or production wells which have undergone hydraulic fracturing by analyzing pressure transient data which results from an injection operation. In wells stimulated though hydraulic fracturing, such as shale gas wells, the stimulated reservoir volume can be estimated in a novel and more accurate way using the information derived by applying the technique. Critically, from an environmental standpoint, the disclosure in one embodiment allows the user to assure containment of the hydraulic fracture within its zone by outputting information about the factors controlling the containment, including the stress contrast between the injection/fractured zone and the bounding layers above and below it, to a fracture simulator which then iterates to solve for the maximum injection pressure limit which assures containment. The limit assures that the containing stresses are not exceeded and thus the fracture remains contained.

The techniques in the disclosure rely on the interpretation of the pressure responses in a well connected to one or multiple hydraulically induced fractures during either a long term or a short term injection operation. These fractured wells can include but are not limited to those with hydraulic fractures created with the intent of increasing production rates, such as in shale gas wells, water-flooding operations for enhanced recovery, a water disposal operation of produced water or waste water with or without a hazardous or industrial waste component(s), or steam or water injection as part of heavy oil or geothermal power production, or a solid waste disposal well, as examples.

The current disclosure utilizes principles of pressure transient analysis to estimate fracture and reservoir characteristics of injection or production wells which have undergone hydraulic fracturing in conventional and unconventional resource basins and water-flooded reservoirs. The techniques relies on the interpretation of the pressure responses in a well connected to one or multiple hydraulically induced fractures during either a long term or a short term injection operation. These fractured wells can include but are not limited to wells in shale gas, shale oil or tight-permeability reservoirs of oil and gas, water-flooding operations for enhanced recovery, a water disposal operation of produced water or waste water with or without a hazardous or industrial waste component(s), or steam or water injection as part of heavy oil or geothermal power production, or a solid waste disposal well, as examples. The well is tested using an injection fall-off test, wherein the injection operation is stopped for some period of time and the pressure response from the well during the shut in period is observed and interpreted. Combining known relations and type curves from the literature in a unified algorithm, an estimate of certain reservoir and fracture characteristics can be made. Specifically, one can delineate the dimensions of the hydraulic fracture (including fracture height, vertical fracture penetration outside the main fractured horizon, and fracture length at the time of shut-in and how these properties change after shut-in), as well as the stress contrasts between injection and containment layers. The stress contrasts between injection and containment layers determines the degree of the hydraulic fracture height containment and whether the injections are operating under safe and environmentally prudent conditions in compliance with the injection permit and regulations.

FIG. 1 is a schematic of an exemplary onshore oil or gas drilling rig and wellbore, in cross-section, according to an aspect of the invention, the system generally designated 10. FIG. 1 is exemplary and the present disclosure is applicable to offshore rigs and wellbores. Rig 12 is positioned over a subterranean formation 14 located below the earth's surface 16. The formation 14, in various embodiments of the disclosure, can be a hydrocarbon-bearing formation targeted for production, a formation targeted for fluid, solid, or gas disposal or storage, a formation targeted for production of geothermal energy, or a formation from which minerals or other materials are extracted using injection operations. Further, the rig and other equipment can be used for various operations, such as water injection operations in conjunction with a production well, hydraulic fracturing of a zone, stimulation or acidizing work, disposal or storage of gas, solid, or liquids, or mineral or geothermal energy extraction.

Rig 12 includes a derrick 34 for supporting a hoisting apparatus for raising and lowering pipe strings, such as work strings, production strings, and casing 20. Similarly, coiled tubing and wireline operations can be run in the well. Pump 30 is capable of pumping a variety of wellbore compositions (e.g., fracturing fluid, proppant-bearing fluid, stimulation treatments, water, steam, injection fluids) of various consistencies (e.g., liquid, gel, slurry, etc.) into the well. One or more pressure measurement devices 38 provide pressure readings, for example, at the pump discharge, at the wellhead, in primary and annular bores, etc.

Wellbore 18 has been drilled through the various earth strata, including formation 14. Upon completion of drilling, casing 20 is typically cemented in place in the wellbore 18 to facilitate the production of oil and gas from the targeted formation 14 while isolating non-targeted formations such as, for example, aquifer formations 15 and 17, and aquiclude or impermeable layers 19 and 21. The targeted formation 14 is bounded above and below by containment layers 21 and 23.

Casing 20 extends downhole along wellbore 18 through vertical and horizontal sections. It is understood that the disclosed methods can be implemented in vertical, horizontal, or deviated wellbores, and in multilaterals stemming from a primary bore. The region between casing 20 and the wall of wellbore 18 is known as the casing annulus. To fill up casing annulus 26 and secure casing 20 in place, casing 20 is usually cemented in the wellbore 18. The casing can be pre-perforated but is typically perforated in place at a targeted zone using typical perforation techniques such as running perforating guns on a work string in the wellbore. The perforations provide fluid communication between the formation 14 and the wellbore 18 interior to the casing. The annular space between the casing and a work string positioned therein is known as the tubing annulus. An exemplary downhole tool assembly 40 is shown in the wellbore 18 and can be one or more downhole tools, connected or disconnected, on a wireline, string, or other conveyance, or permanently installed in the wellbore. For example, the tool assembly 40 can include an array of sensors for data acquisition and transmission.

In some embodiments of the disclosure, the methods are used with respect to a production well which is hydraulically fractured. During hydraulic fracturing operations, fracturing fluid, stored in surface tanks 22, piped or tracked in, is pumped downhole by pump 30 under pressure. The pressurized fracturing fluid flows downhole through the wellbore, through the casing perforations, and into the targeted zone 14 where it induces multiple fractures 24. Proppant and treatment fluids can also be pumped into the formation before, after, or with the fracturing fluid. The fractures 24 typically intersect one another, creating a connected fracture network. In many formations, multiple targeted zones are fractured, typically sequentially, and can be fluidly isolated from one another to allow, in conjunction with isolation or barrier devices, downhole valves, and the like, control of fluid communication with each zone. During fracturing operations and during closure or shrinkage of created fractures, micro-seismic events, A, can be detected.

In other embodiments, the disclosed methods are used with regard to injection operations, such as water-flooding operations for enhanced recovery, waste water disposal with or without hazardous components, steam or water injection operations for heavy oil recovery or geothermal power production or mineral extraction, or disposal of other liquids, gases, or solids. In a waterflood operation, water and other fluids are pumped under pressure into a wellbore and the formation to "push" in situ hydrocarbon-bearing fluids into one or more adjacent production wells. In disposal operations, waste-water is injected into the targeted formation 14. The waste-water can include various chemicals, cuttings, sand, mud, etc., and can have various consistencies, such as sludge, slurry, solids-bearing fluids, etc.

Figure 3:
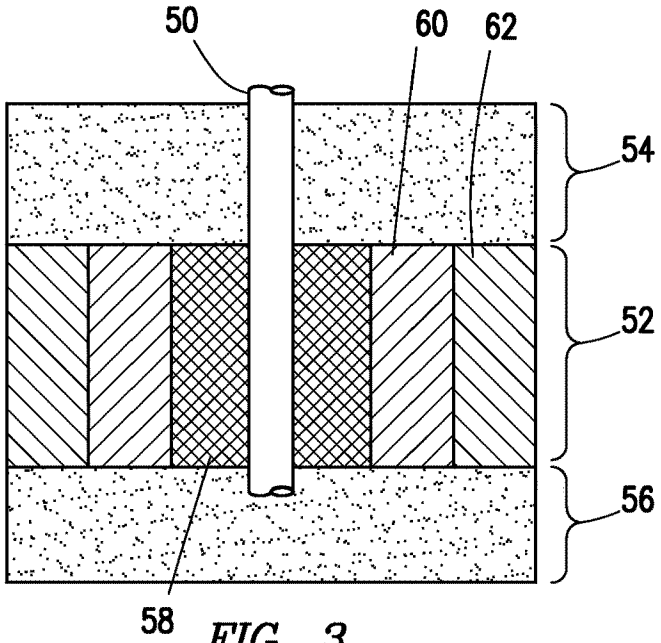
FIG. 3 is a schematic side view of the exemplary wellbore of FIG. 2.
Figure 2:
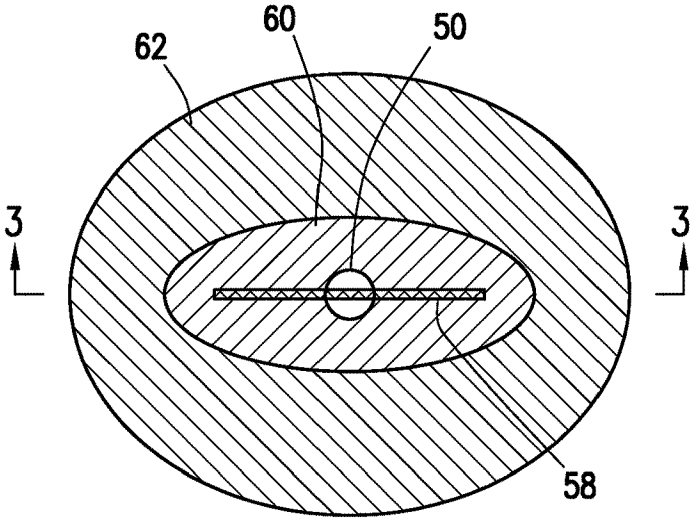
FIG. 2 is a schematic top view of a target zone surrounding an exemplary wellbore.

FIG. 2 is a schematic top view of a target zone surrounding an exemplary wellbore. FIG. 3 is a schematic side view of the exemplary wellbore of FIG. 2. FIGS. 2 and 3 are discussed together. Wellbore 50 extends through target zone 52 bounded above and below by containment zones 54 and 56. An exemplary fracture 58 is seen extending from the wellbore 50. Additionally, the system defines two mobility zones (i.e., a dual mobility system), namely an inner mobility zone 60 and an outer mobility zone 62 spaced radially from the wellbore 50 as shown. The mobility zones are shown as elliptical in cross-section and of uniform height, although in a reservoir these zones would be more irregularly shaped. Each of the target injection, upper containment, and lower containment zones has an associated stress, namely, an injection zone stress, and an upper and lower zone confining stress. These are measurable or calculable and used to determine stress contrasts, that is, the difference between the injection zone stress and the upper and lower zone confinement stresses, respectively.

As explained elsewhere herein, to discover the properties and behaviors of the targeted zone, inner and outer mobility zones, etc., it is common to perform injection or pressure tests, especially a pressure fall-off test. A pressure fall-off test, involves injecting a well and reservoir to a determined pressure, then ceasing pumping and shutting-in the targeted zone. The zone pressure and ensuing pressure decline is measured against time. Pressure sensing and measurement can occur at the surface, in which case bottom-hole pressure is calculated, or in the wellbore. The measured and calculated data is used to create pressure transient curves or plots. Pressure of the zone is measured using typical techniques and equipment, such as downhole pressure sensors and communication equipment.

Each mobility zone has a particular relative permeability. Relative permeability is a function of permeability and fluid type. Thus, one fluid in a dual permeability reservoir rock constitutes a dual-mobility system. Similarly, two fluids (e.g., water and oil) in one reservoir rock type could also be a dual-mobility system, as would certain combinations of the two. Similarly, multiple-zone systems (of more than two zones) exist and can be modeled and analyzed using the methods herein.

The exemplary fracture 58 defines a fracture plane having a height, length, and a width. During injection, the fracture is created, propagated and enlarged. During shut-in and fall-off after cessation of injection, the fracture is partially or wholly mechanically closes and may shrink in either or both length and height, all of which alters the transient pressure response.

Figure 4A:
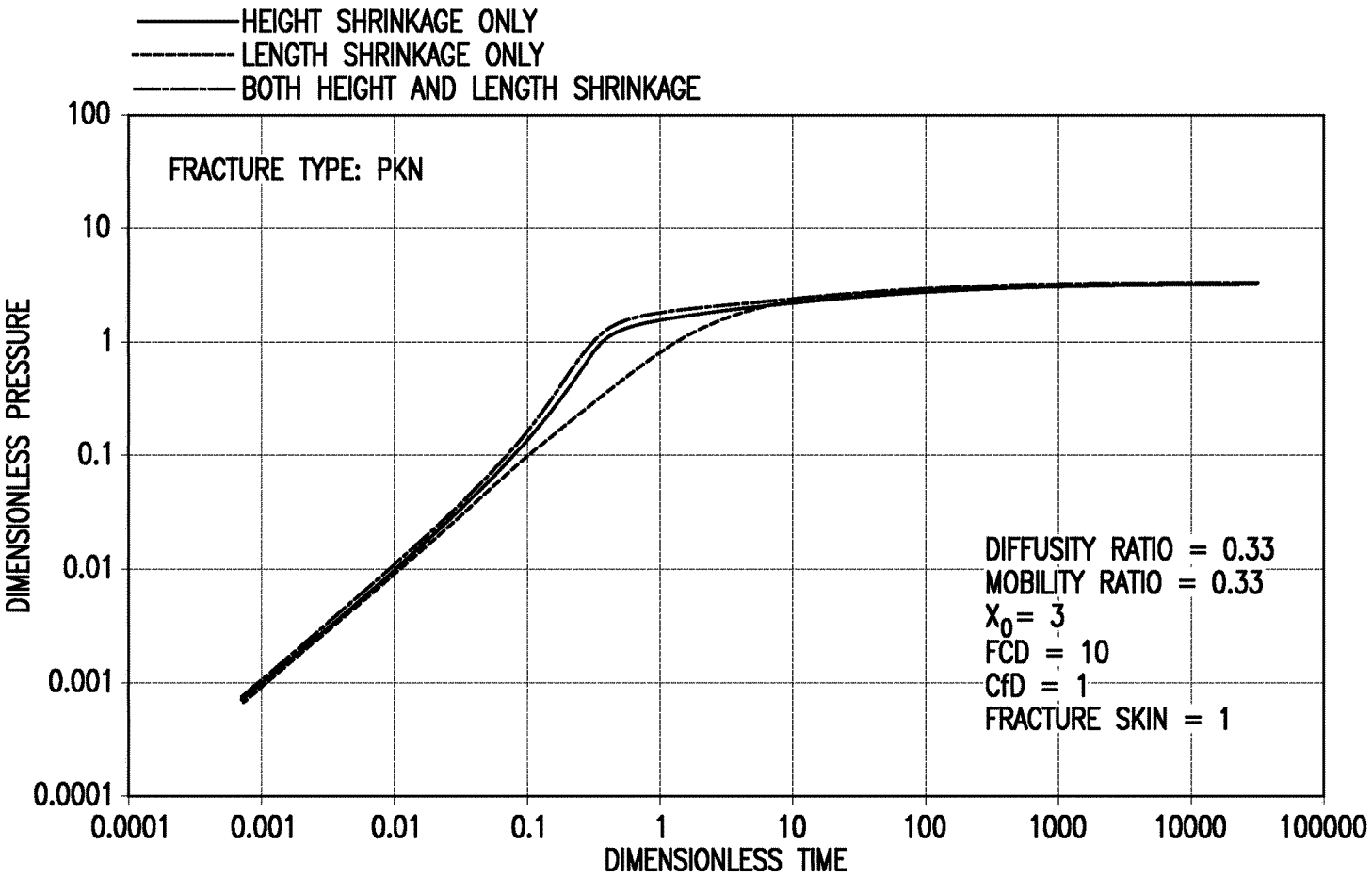
FIGS. 4A-B are graphical representations of an exemplary pressure transient response and its derivative, after an injection operation for a fractured formation after the operation has stopped.
Figure 4B:
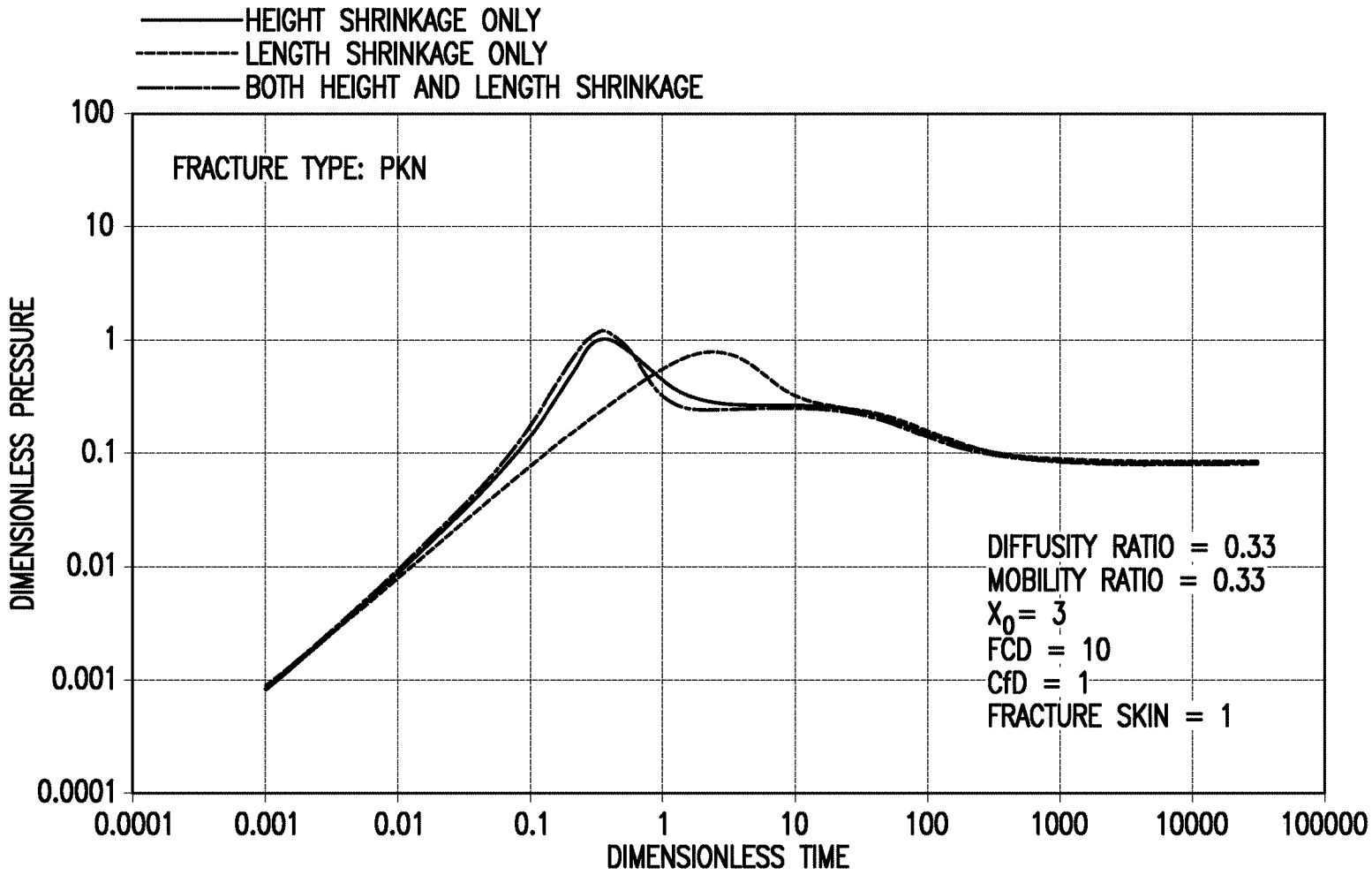

FIGS. 4A-B are graphical representations of an exemplary pressure transient response and its derivative, after an injection operation for a fractured formation after the operation has stopped. The graph at FIG. 4A depicts the change in pressure with time between the original injection operation pressure and a final fall-off pressure. It is typical to plot pressure and time as dimensionless, the measured or calculated values made dimensionless using known relationships combined with known physical characteristics of the system or assumptions of physical characteristics informed by other known data. This facilitates matching to type curves which are also dimensionless. The pressure declines as the injected fluid dissipates through the fracture into the formation. The type curve is characteristic of injection in a fractured system with fracture shrinkage and closure upon injection cessation. The type curve plots demonstrate pressure and pressure derivative responses for three different types of shrinkage: height shrinkage only, length shrinkage only, and combined height and length shrinkage upon shut-in. These are typical responses for two-zone reservoirs in which the inner mobility zone has a higher mobility (e.g., through stimulation, lower viscosity fluid flow, etc.) than the outer mobility zone. The transition from the inner mobility zone to the outer mobility zone is identified in the transient derivative in FIG. 4B where the type curve declines from a higher stabilized pressure level to a lower one.

Type curves are paired pressure-transient responses and their derivatives having characteristic shapes related to certain features of a physical system, as computed from a model based on mathematical solutions to equations which describe the physical system. The model is usually generated from an analytical solution of the diffusion equation with boundary conditions strategically defined to enable observation of theoretical trends in the pressure-transient response. Boundary conditions that can be defined near the well include constant or variable wellbore storage, limited entry (partial penetration), radial composite (damage skin due to permeability alteration), and a fracture extending the cylindrical wellbore to a extended plane. The borehole trajectory can be vertical, angled, or horizontal. The distant boundary conditions include a sealing or partially sealing planar boundary (fault), intersecting faults and rectangular boundaries (sealing or constant pressure). Further, the diffusion equation can be adjusted to accommodate reservoir heterogeneity in the form of dual porosity or layering. Finally, when generated with computer assistance, the type-curve family can account for superposition in time due to flow-rate variations before and even during the transient data acquisition. Type curves or type curve families are printed on specialized coordinates (e.g., log-log) with dimensionless parameters or software-generated on a screen and stored in a database. Further, automated regression permits an optimized match between the acquired data and a selected model. Type curves enhance the ability to interpret potential explanations for transient data trends. Type curves are known in the industry and readily available in industry literature.

Conventional pressure transient analysis (PTA) methodologies suffer from a major shortcoming in that they do not provide important details about closure and shrinkage of fractures or the geomechanics of reservoir mobility. The vertical shrinkage phenomenon during fracture closure occurs due to the stress contrast between injection and containment layers.

Applying and extending the disclosed methodologies herein produces a more realistic and accurate determination of geomechanical reservoir parameters as determined from a pressure fall-off signal during and after an injection operation above fracturing pressure. The disclosed methods use equations to relate fracture height, within and outside the injection zone, and the stress contrast between the injection layer and the containment layer(s).

The disclosed methods use relationships in the log pressure-log time domain to evaluate initial fracture length and fracture conductivity. Changes in fracture dimensions (shrinkage) define a pressure-dependent fracture conductivity that affects the shape of the pressure transient response during pressure testing.

Further, the methods determine the degree of hydraulic fracture containment, indicating whether prior injections were under conditions which are prudent to assure containment of the injected material (or in-situ materials once the injection operation ceases) within the target zones. Thus, in an embodiment, the stress contrasts between injection and containment layers, as identified through the method, are used to influence parameters of a fracturing simulation to determine a maximum injection pressure which still assures containment. The maximum pressure is applied as a limit to the field operation before resumption of the current operation or for future operations in the same reservoir or field having the same stresses.

Further, the disclosed methods provide the ability to understand essential elements of fracture behavior of dual- and multiple-mobility zones and different geomechanical zones, including closure and shrinkage of fractures, (early) transient elliptical reservoir-fluid flow, infinite and finite fracture conductivity, fracture face skin, and the effect of wellbore storage. The disclosed methods allow modeling of the pressure transient response to account for mobility discontinuity. This enables an estimation of permeability in the inner and outer mobility zones, such as would be observed in wells with near-wellbore damage, water injection into an oil bearing zone, slurry injection into fractures in a water-bearing zone, reservoirs with both stimulated and un-stimulated volumes, or having a high permeability (e.g., due to a discrete fracture network (DFN) or random fracture network). The methodologies identify the boundary of the inner mobility zone near the well and relate that to the fracture network region size. In certain cases, the inner mobility region is identified as the stimulated reservoir volume (SRV) and its size or boundary is reported as equal to that of the SRV. The estimate of the SRV can thereafter be used to optimize production and drilling decisions within a given well or across a given field.

For production wells, the methods assess a stimulated reservoir volume (SRV), formation effective permeability (or transmissibility), and stress contrast for dual-mobility (and multiple mobility) zones. For injection wells, the methods determine whether the fracture(s) exceed the target injection zone, the degree of fracture incursion into the containment zone(s), and a recommended pump pressure maximum for future operations in the tested or similar zones. Where containment has not been breached, the methods supply an estimate of additional pressure the injection zone can sustain before fracturing the containment layers.

The methods disclosed herein are performed using software and data stored on physical media readable by a computer upon which the software is installed or accessible. The stored data, or real-time data, can reside or be created at a distant location and transmitted via the internet or cloud. Similarly, the software can be run resident on a user's computer or server, or can be run on a distant computer or server with data transferred between the computers and/or servers via the internet or other connection. The disclosed methods are executed by a software program to simulate input parameters which control the shape of type curves of pressure response over time and its derivative and to match these resultant type curves to field-derived data. In one embodiment, the software uses regressive optimization techniques to facilitate the rapid simulation of many input parameters to make the type curve match.

The software models a subterranean zone or zones and a pressure transient response after cessation of injection of a fluid into the zones. The software models pressure transient behavior after shut-in and during fall-off until pressure stabilization. Flow is modeled through the fracture first in its open state and secondly after mechanical closure. Closure is modeled as a gradual event, while the modeled fracture can shrink in height and/or length during closure. The flow pattern beyond the fracture is considered to be elliptical in nature. An elliptical composite model is considered with two zones: an inner mobility zone having a mobility value corresponding to the injected fluid and an outer mobility zone with a mobility value corresponding to the original reservoir or aquifer fluid.

The software relies on a set of selectable assumptions. For example, in a preferred embodiment, the following assumptions can be applied to a simulated pressure transient: fractures are considered to have infinite-conductivity or finite-conductivity; the reservoir can be modeled as having single-mobility, dual-mobility, or multiple-mobility zones within reservoir (swept and upswept regions); elliptical flow is assumed in the reservoir; fracture skin effect can be modeled in the case of finite-conductivity fractures; and wellbore storage effects can be modeled in the case of finite-conductivity fractures.

The software, for an injection well, assesses fracture dimensions and other characteristics, formation permeability, injection zone and containment zone stress contrasts, and the extent of the flooded zone. For a production well stimulated with one or more hydraulic fractures, the software assesses the dimensions and other characteristics of the fracture or network of fractures, the extent of the stimulated reservoir volume (SRV), and the formation permeability.

The following Input and Output Data is used in conjunction with the methods presented herein. The method requires input, referred to as "fixed input," based on measured field data, of the following parameters: formation height (thickness), formation volume factor, injected fluid initial saturation, injection fluid compressibility, injection fluid viscosity, reservoir fluid viscosity, injection rate, pore fluid residual saturation, pressure vs. time data, reservoir Poisson's ratio, reservoir porosity, reservoir Young's modulus, total compressibility, volume injected, and wellbore volume. The input can be manually from a user, from a stored data file on a database, etc.

Additionally, the following parameters can either be input by the user or calculated from the input field data: containment layer stress, fracture half length, fracture storage constant, injection layer stress, mobility front (elliptical or other), mobility ratio, permeability of the inner zone, and wellbore storage constant.

Finally, the output data provided by the method can include the following, calculated by type curve matching and equations as explained elsewhere herein: containment layer stress, fracture half length, fracture storage constant, injection layer stress, mobility front (elliptical or other), mobility ratio, permeability of the inner zone, permeability of the outer zone(s), fracture conductivity, fracture penetration into containment layer, fracture skin, rate of fracture length shrinkage, wellbore storage constant, and stimulated reservoir volume.

Figure 5:
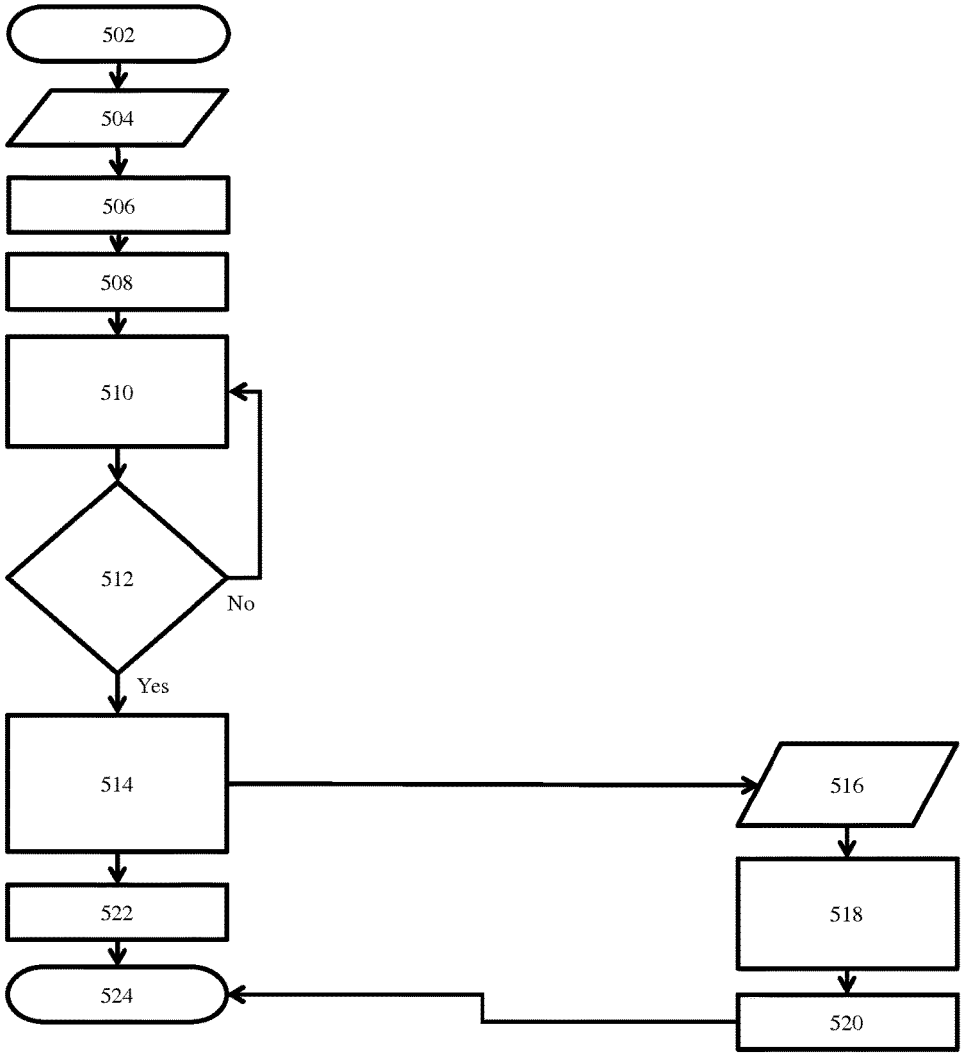
FIG. 5 is a flow chart of an exemplary algorithm used by the software and methods of the disclosure.

FIG. 5 is a flow chart of an exemplary algorithm used by the software and methods of the disclosure. The chart is exemplary in nature and constitutes a main algorithm or flow chart for a preferred method.

The method starts at block 502, as the computer reads and/or the software pulls and reads a database set of Input Data provided as inputs to the program. The Input Data is actual field data at least for the pressure and time data and preferably for all fixed data. Potentially estimated or presumptive data can be input, for example, regarding injected materials and reservoir characteristics, and potentially data regarding the wellbore schematic and geometry. From the input data, a plot or curve is created. At block 504, the Input Data is Pre-treated. At block 506, curve plots are created using the Input Data, including derivative curves as needed.

At block 508, the method isolates the water hammer effect from the pre-treated and/or input data. Isolating and minimizing the water hammer effect is discussed further with respect to FIG. 8.

At block 510, initial estimates for type-curve parameters for the upper and lower limit curves are selected. The selection of upper and lower type-curves can be performed by the user, automatically by the software, or suggested by the software and presented for selection by the user. Where the software makes the selection, a subroutine selects initial curves based on key data points. At block 512, a check is made to ensure that all the input field data fit within the upper and lower limit curves. The goal of initial upper and lower curve selection is to select curves which do not intersect a curve described by the input data, and between which the input data curve completely fits. If the input data curve does not meet these parameters at block 512, an error message is returned and additional upper and/or lower curves are selected as needed.

At block 514, the method simulates type-curves by modifying the curve parameters using a curve-fitting, convergence algorithm. The goal is to create a mathematically described curve which closely matches or "fits" the input data curve. The convergence algorithm is preferably iterative and can take various forms as is known in the art. For example, evolutionary algorithms, genetic algorithms, metaheuristic optimization algorithms, trial-and-error, linear and non-linear optimization techniques, least squares regression, etc. In one embodiment, iteration continues until the fit of the calculated curve meets a pre-selected standard. Such a standard can be set in terms of standard deviation, minimizing a residual error, or other technique. A type-curve with parameters best matching the input data curve is chosen. In one embodiment, this iterative curve-fitting is performed with multiple algorithms. Each algorithm provides a "best fit" curve. The best fits can be compared to select the closest match to the input data curve. Further regression techniques are known in the art and can be used in conjunction with the methods disclosed.

At block 522, the stimulated reservoir volume (SRV) is calculated, saved, and/or displayed. Calculation of the SRV is detailed at FIG. 9.

Block 516 indicates that the method, based on the solution solved for at block 214, outputs stress contrast information to a fracture simulator. The stress contrast is the difference in stress between the target injection zone and adjacent containment zone(s). The solution for stress contrast is useful in further calculation of various criteria, such as estimating waterflood design, maximizing fracture extent, etc.

At block 518, the method conducts iterative fracture simulations to calculate a maximum injection pressure at which containment stresses are not exceeded. The iterative fracture simulations are forward-iterations of hydraulic fracture propagation. The simulations use data, known and/or estimated, regarding the formation layer characteristics, the amount and type of fluid being injected, the pump pressure or bottom-hole pressure, characteristics of the reservoir rocks or reservoir fluids, etc. In one embodiment, the simulations are run beginning with relatively low pressure (pump, bottom hole, etc.) and then with increasing pressures, until the simulated fracture(s) breaches the target injection zone and extends into an adjacent containment zone. The simulation models are typically complex, non-linear functions. In one embodiment, the simulations are run only varying one parameter, for example, the pump pressure until non-containment is reached. In other embodiments, multiple parameters can be changed, such as pump pressure, fluid characteristics, etc. The model can be used to generate a maximum pump pressure for given fluid, wellbore, and reservoir parameters to create a maximum fracture without breaching a containment zone. Alternately, other variables can be solved for. For example, if the user wants to calculate a maximum contained volume in the injection zone, the model can solve for pressure and fluid properties to reach the maximum contained volume. Other model variables and target solutions will be apparent to those of skill in the art.

At block 520, the method provides an injection pressure limit to assure containment in the targeted fracture zone. This can be converted, if desired, to a maximum pump pressure, maximum bottom-hole pressure, etc. At block 524, the method ends and the various solved parameters are saved to a database, displayed to a user, or both.

Figure 6:
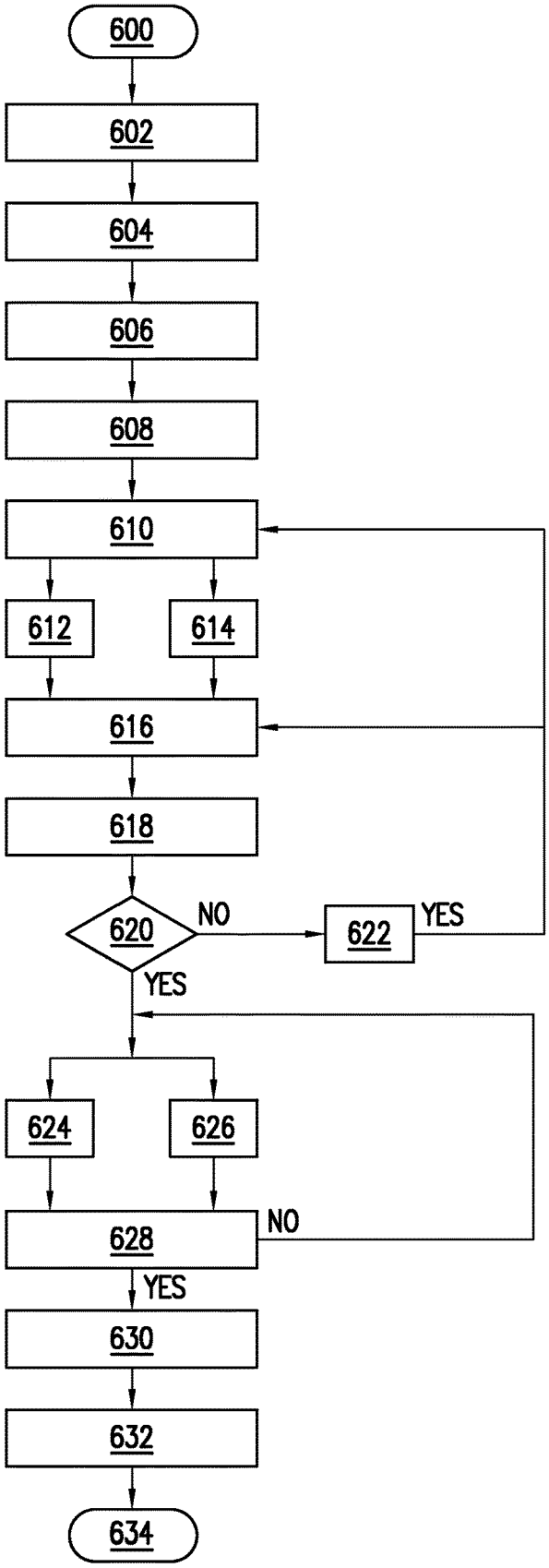
FIG. 6 is an alternative exemplary flow chart according to an embodiment of the method.

FIG. 6 is an alternative exemplary flow chart according to an embodiment of the method. The flow chart at FIG. 6 is similar to that of FIG. 5 in some respects, with additional details and steps added. The method begins at block 600. Data is read, retrieved, and/or stored at block 602. Pre-treatment of data occurs at block 604. At block 606, the water hammer effect is isolated. Also see FIG. 8. An input data plot and its derivative can be generated and displayed.

At block 610, the program presents the user with an opportunity to select a model. In one embodiment, possible selections are made between each of the following pairs: infinite or finite conductivity; single or dual mobility zones; and shrinking or non-shrinking (fixed) fracture. In other embodiments, additional selections can be made, such as for fracture model type (e.g., PKN, GDK, elliptical, etc.). Further, embodiments can allow selection of fracture closure rates. In one embodiment, selection is made for fracture closure dimensions (height, length, both, neither). In other embodiments, the mobility zones can be expanded to multiple (greater than two) mobility zones. Other selectable model variables will be apparent to those of skill in the art.

At block 612, one exemplary selection is made, namely, Infinite Conductivity, Shrinking Fracture, and Dual Modality (ICDM). At block 614, a separate exemplary selection is made, namely, Finite Conductivity, Shrinking Fracture, and Dual Modality (FCDM). These selections can be made by the user or automatically by the software based on analysis of input data or randomly.

At block 616, the step of identifying a selected shrinkage type is performed by the user or automatically by the software. For example, the type of shrinkage can be selected between shrinkage of fracture height, length, both or neither. These selections can be made by the user or automatically by the software based on analysis of input data or randomly.

At block 618, setting-up limits for upper and lower bound curves, as described herein. At block 620, determining whether the fixed curve, based on the input data, is within the selected upper and lower curves and/or do not intersect the fixed curve. At block 622, optional changing of the model and/or shrinkage types, as determined by the user or automatically by the software. At block 624, using a curve-fitting, iterative algorithm to select new values for the parameters in the ICDM type-curve generation.

At block 626, using a curve-fitting algorithm to select new values for parameters in FCDM type-curve generation. At block 628, comparing the generated type-curves with the input data curve(s) and determining whether there is an acceptable match or fit. This can be performed by the user or automatically by the software based on a selected or derived level of acceptability. The acceptability can be based on standard deviation, residual error size, etc.

At block 630, displaying, saving, or displaying the output results. At block 632, calculating SRV. At block 634, ending the routine, saving and/or displaying the results.

Figure 7:
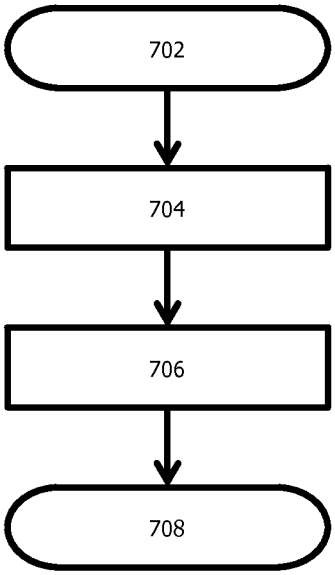
FIG. 7 is an exemplary flow chart for a method of pre-treating input data according to an embodiment of the method.

FIG. 7 is an exemplary flow chart for a method of pre-treating input data according to an embodiment of the method. The flow chart at FIG. 7 is an expansion of the block 506 of FIG. 5 and block 604 of FIG. 6.

At block 702, pre-treating the input data. The flow chart begins and the method alters or pre-treats the input field data. At block 704, the data, which is dimensional when input in most cases, is converted to non-dimension data using estimation parameters. Methods for converting to non-dimensional data are known in the art. At block 706, the time domain is discretized for pressure calculations. And at block 708, the subroutine ends, with converted and discretized data saved to a database, stored, and/or displayed.

Figure 8:
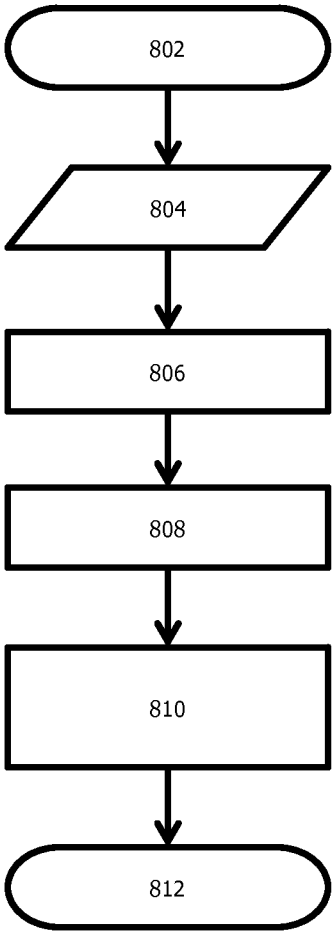
FIG. 8 is an exemplary flow chart for isolating the water hammer effect according to an embodiment of the meth.

FIG. 8 is an exemplary flow chart for isolating the water hammer effect according to an embodiment of the method. The water hammer effect is a pressure surge or wave caused when the injection is stopped by closing a valve. A pressure wave propagates along the system in a generally decreasing or declining curve with a superimposed declining oscillation. The flow chart at FIG. 8 is an expansion of the block 508 of FIG. 5 and block 606 of FIG. 6.

At block 802, the subroutine starts, including accessing any previously input or calculated data needed for the subroutine. At block 804, the data is identified, selected and read. At block 806, the data affected by the water hammer is identified. This can be performed by the user or automatically by the software, such as by identifying on a plot of the input data a beginning and end point where the water hammer effect is seen. The end point, for example, can be selected where the pressure oscillation smooths to an acceptable degree. At block 808, the effect of the water hammer on the affected data is isolated. At block 810, the data is smoothed, mathematically, to eliminate or minimize the effect of the water hammer on the data. The subroutine ends at block 812 and the smoothed data is stored and saved in a database.

Figure 9:
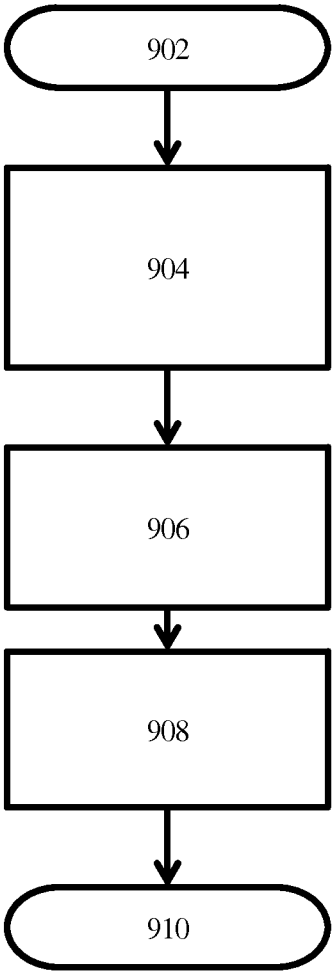
FIG. 9 is an exemplary flow chart for calculating the stimulated reservoir volume (SRV) according to an embodiment of the m.

FIG. 9 is an exemplary flow chart for calculating the stimulated reservoir volume (SRV) according to an embodiment of the method. The flow chart at FIG. 9 is an expansion of the block 522 of FIG. 5 and block 632 of FIG. 6.

At block 902, the method or program starts. At block 904, using final simulation parameters to provide information about the reservoir, fracture dimensions, closure stresses, and the inner and outer mobility zones. At block 906, identifying the inner zone transmissibility and the dimensionless time at the end of the first pseudo-radial flow period. At block 908, estimating the radius of zone of enhanced transmissibility, which is identified as the stimulated reservoir volume. And at block 910, ending the program, storing results in a database, displaying results, etc.

Figure 10:
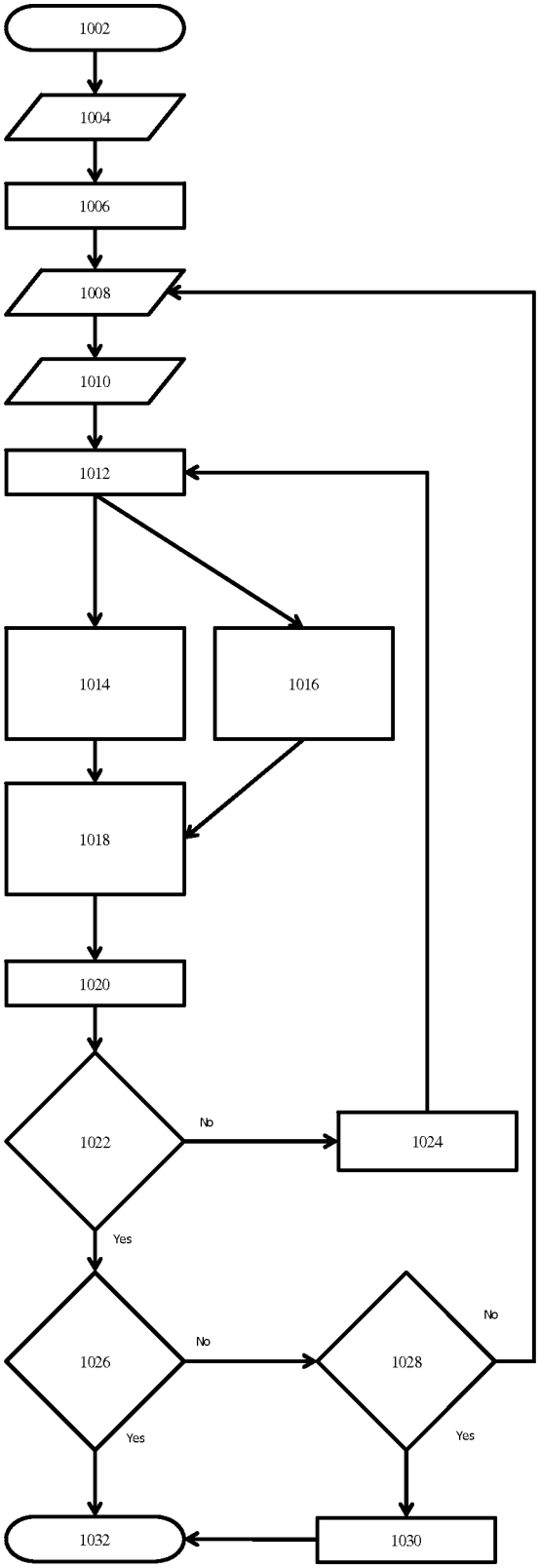
FIG. 10 is an exemplary flow chart for simulating type-curve parameters according to an embodiment of the method.

FIG. 10 is an exemplary flow chart for simulating type-curve parameters according to an embodiment of the method. The flow chart at FIG. 10 is an expansion of the block 514 of FIG. 5.

At block 1002, beginning the routine. At block 1004, reading the appropriate input and calculated data. At block 1006, identifying key parameters from input data, such as field pressure and time data. The key parameters can be identified by the user or automatically by the software program. The key parameters will be apparent to those of skill in the art.

At block 1008, selecting shrinkage type (height, length, both, none) by the user or automatically. At block 1010, selecting fracture type (PKN, GDK, elliptical, other). At block 1012, calculating or estimating type-curve parameters from input data or calculated data. At block 1014, calculating a curve of non-dimensional fracture storage constant as a function of pressure. At block 1016, as an additional or alternate step to that of block 1012, calculating non-dimensional differential pressure using the exact solution for a non-shrinking fracture for the time steps before initiation of shrinkage. At block 1018, calculating non-dimensional pressure for the remaining time steps using the previous time step results and the curve of fracture storage constant as a function of pressure.

At block 1020, save case information. At block 1022, determining whether an acceptable match has been achieved for the given shrinkage and fracture types. If not, another iteration is performed as indicated in the figure. As explained elsewhere herein, the acceptability of the solution or curve fit can be determined by the user of the automatically and can be based on residual error, standard deviation parameters, etc.

At block 1024, running an iterative curve-fitting algorithm to suggest changes to model parameters. At block 1026, determining whether an acceptable match to field data has been calculated. As explained elsewhere herein, the acceptability of the solution or curve fit can be determined by the user of the automatically and can be based on residual error, standard deviation parameters, etc.

At block 1028, if the method is automated, determine whether all combinations of fracture type and shrinkage type have been exhausted. That is, the method can include reiteration of the process for each possible or selected possible combinations of fracture and shrinkage type. In such a case, the method includes selecting the best match for later use. In an embodiment, the user can eliminate classes of models by selecting or eliminating certain parameters. At block 1030, selecting a best match from calculated and saved cases. At block 1032, ending the routine, saving the calculated data, displaying the calculated data, etc.

Figure 11:
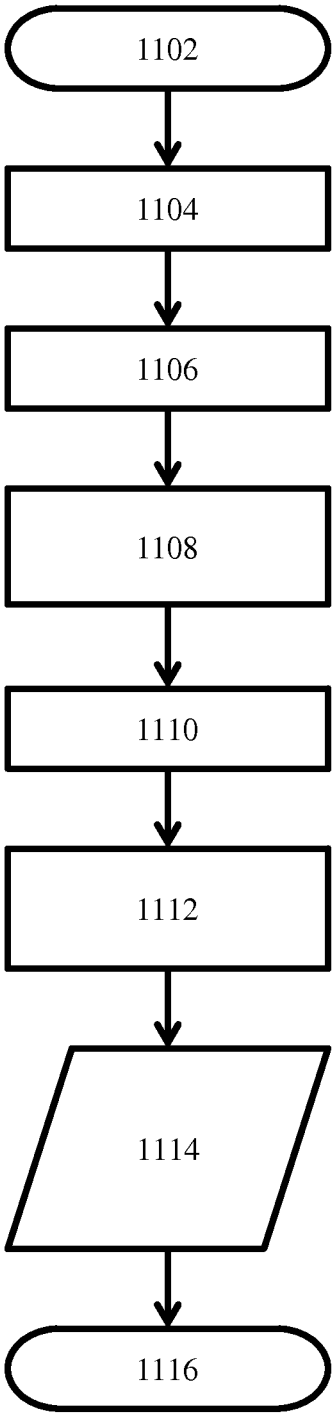
FIG. 11 is an exemplary flow chart for calculating non-dimensional differential pressure using the exact solution for a non-shrinking fracture for the time steps before initiation of shrinkage according to an embodiment of the method.

FIG. 11 is an exemplary flow chart for calculating non-dimensional differential pressure using the exact solution for a non-shrinking fracture for the time steps before initiation of shrinkage according to an embodiment of the method. The flow chart at FIG. 11 is an expansion of the block 1016 of FIG. 10.

At block 1102, beginning the subroutine, identifying and pulling relevant data, etc. At block 1104, calculating Mathieu Functions and required coefficients. At block 1106, building the system of unknowns and solving for the unknowns. At block 1108, calculating a constant terminal pressure solution and constant terminal rate solution. At block 1110, calculating a pressure solution in Laplace space. At block 1112, using the Stehfest algorithm to invert to pressure in time domain. At block 1114, outputting dimensionless pressure and pressure derivatives at specific dimensionless calculation times. At block 1116, saving calculated data, displaying data, etc.

Figure 12:
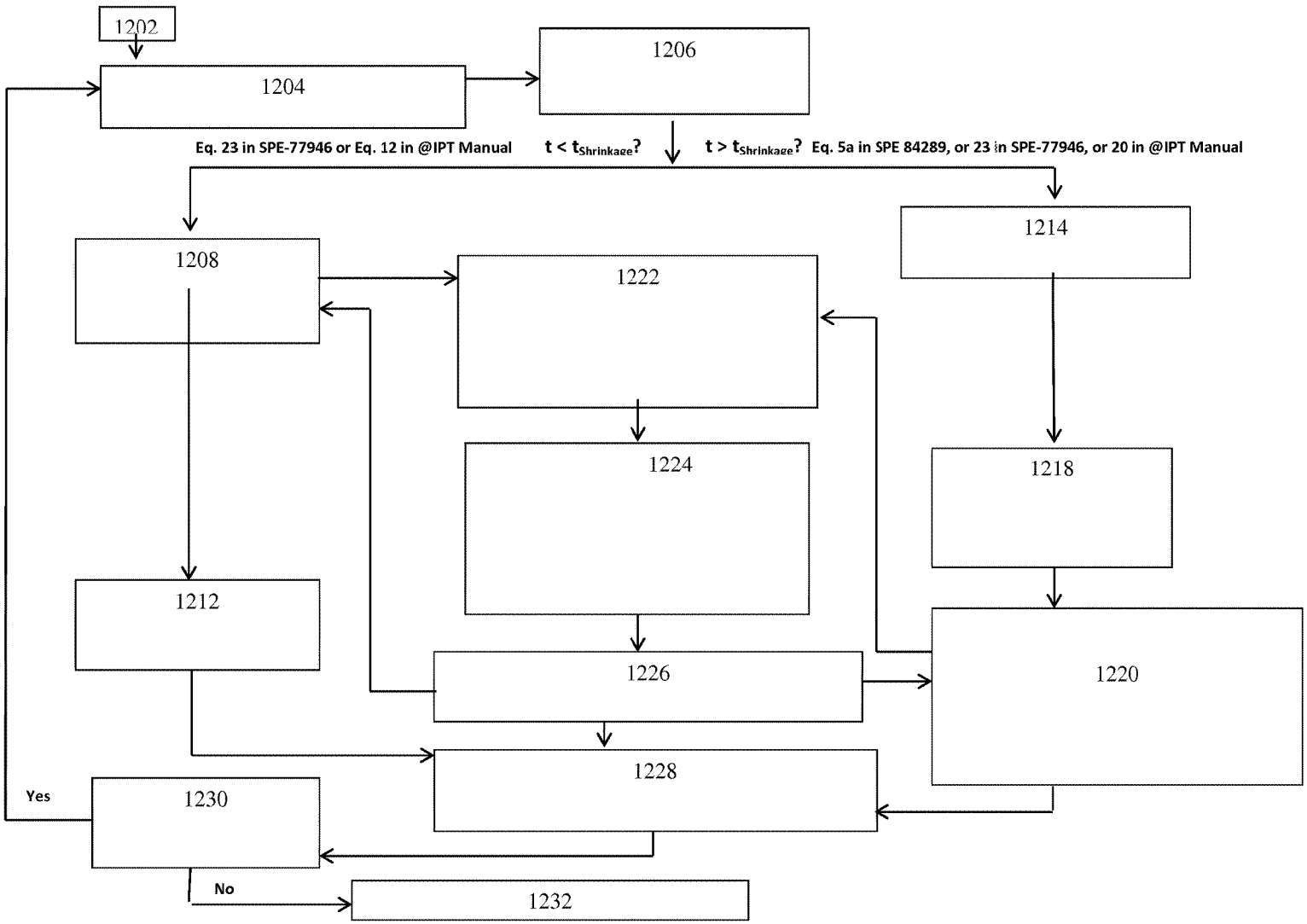
FIG. 12 is an exemplary flow chart for an exemplary case, namely, a Finite Conductivity, Shrinking Fracture, Dual Mobility case, according to an embodiment of the method.
Figure 13:
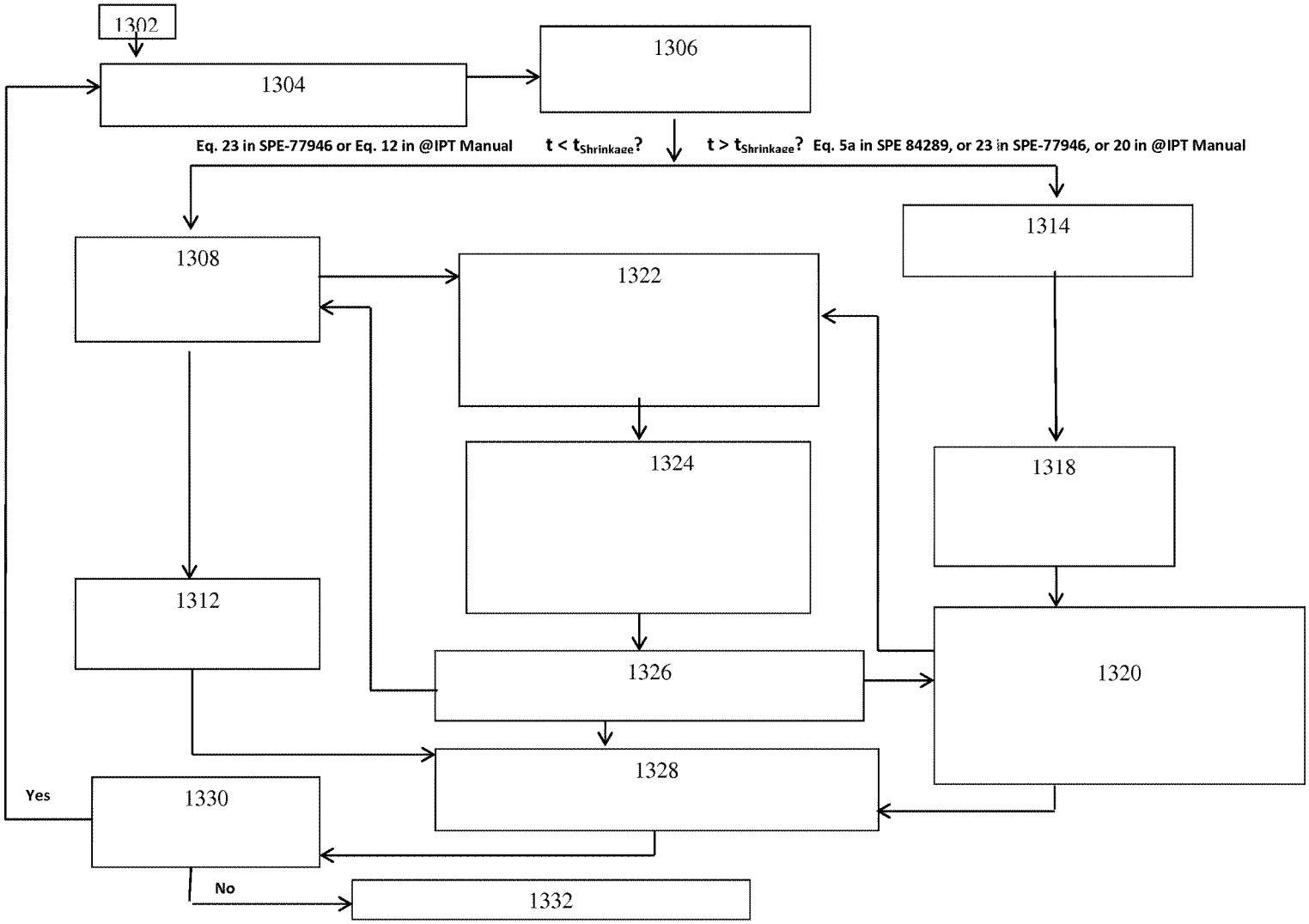
FIG. 13 is an exemplary flow chart for an exemplary case, namely, an Infinite Conductivity, Shrinking Fracture, Dual Mobility case, according to an aspect of the invention.

FIG. 12 is an exemplary flow chart for an exemplary case, namely, a Finite Conductivity, Shrinking Fracture, Dual Mobility case, according to an embodiment of the method. The flow chart at FIG. 12 is an expansion of the block 614 of FIG. 6. FIG. 13 is an exemplary flow chart for an exemplary case, namely, an Infinite Conductivity, Shrinking Fracture, Dual Mobility case, according to an aspect of the invention. The flow chart at FIG. 13 is an expansion of the block 612 of FIG. 6. Note that these are merely two selected example cases and their corresponding exemplary flow charts. It will be apparent to those of skill in the art that flow charts can be created for the additional combinations of factors (infinite or finite conductivity, shrinkage or none, single or dual mobility) as well as for additional combinations in embodiments allowing selection of additional variables.

At block 1202, the routine or subroutine begins. At block 1204, performing non-dimensionalization of the input data. At block 1206, discretizing time domain for pressure calculations, typically with a selected minimum number of time steps, such as 50. At block 1208, calling to receive constant terminal rate pressure solution in Laplace space. At block 1212, using the Stehfest algorithm to invert to pressure in time domain. At block 1214, using the most recent values for fracture height and length to calculate fracture volume derivatives. At block 1218, rewriting in a discretized form an equation for point-wise expression in time. At block 1220, calculating pressure and pressure derivatives in Laplace space at each time step and calculating new fracture height and length values. At block 1222, calculating Mathieu functions and the required coefficients, for example, Mathieu characteristic values, Fourier coefficients, appropriate functions (e.g., $Ce_{2n}$, $Fek_{2n}$, $ce_{2n}$) and their derivatives. At block 1224, building the system of equations and solving. For example, 3n unknown, solving for $C_{2n}$, $F_{2n}$, and $E_{2n}$. At block 1226, calculating constant terminal pressure solution and calculating constant terminal rate solution. At block 1228, outputting fracture height and length and dimensionless pressure and pressure derivative at specific dimensionless calculation time. At block 1230, dimensionalizing the output parameters. Deciding whether to continue type-curve generation. At block 1232, outputting reservoir and fracture parameters.

FIG. 13 begins at block 1302. At block 1304, Performing Non-Dimensionalization of the Input Data. At block 1206, Discretizing Time Domain for Pressure Calculations (with a Minimum number of Time steps; say, 50). At block 1308, calling to Receive Constant Terminal Rate Pressure Solution in Laplace Space. At block 1312, using the Stehfest Algorithm to invert to Pressure in Time Domain. At block 1314, Using the Current Values for Fracture Height and Length to calculate Fracture Volume Derivatives. At block 1318, rewriting in a discretized form an equation for point-wise expression in time. At block 1320, Calculating Pressure and Pressure Derivatives in Laplace Space at each Time Step and Calculating new Fracture Height and Fracture Length. At block 1322, Calculating Mathieu Functions and Required Coefficients, such as Mathieu Characteristic Values, Fourier Coefficients, Functions $Ce_{2n}$, $Fek_{2n}$, $ce_{2n}$ and their Derivatives. At block 1324, Building the System of Equations and Solving (e.g., for 3n Unknown, Solving for $C_{2n}$, $F_{2n}$, and $E_{2n}$). At block 1326, Calculating Constant Terminal Pressure Solution and Calculating Constant Terminal Rate Solution. At block 1328, Outputting Fracture Height and Length and Dimensionless Pressure and Pressure Derivative at Specific Dimensionless Calculation Time. At block 1330, Dimensionalizing Output parameters and determining whether to Continue Type Curve generation. At block 1332, Outputting Reservoir and Fracture Parameters.

Equations for use in conjunction with the above methods, method variations and alternatives are discussed herein below.

The dimensionless fracture length is assumed to be sufficiently small ($x_{fD}$<0.1) so that during propagation, the pressure distribution surrounding the fracture behaves as if it were quasi-steady state. The dimensionless fracture length is determined using the following equation:

$$x_{fD} = \frac{x_f(t)}{\sqrt{\eta t}};\ \eta = \frac{k}{\phi\mu c_t} \qquad \text{Equation 1}$$

In one embodiment, the medium is considered as an isotropic, homogeneous, horizontally infinite reservoir with uniform properties which contains one or two zones of slightly compressible fluid. A different constant mobility and diffusivity is assigned to each zone. The discontinuity in fluid mobility takes the shape of an ellipse that is confocal with the fracture tips. The fracture length and height can be considered as fixed or, preferably, as decreasing (shrinking) during closure, at a selected closure rate or one of several user-selectable rates. That is, in one embodiment, fracture shrinkage is modeled.

In alternate embodiments, the modeled medium can be non-isotropic, non-homogenous, horizontally finite, or having non-uniform properties, or any combination thereof. Further, in some embodiments, the modeled reservoir has two or more mobility zones. Alternately, the discontinuities in fluid mobility can take non-elliptical shape, such as for an anomalous zone, intersecting zones, etc.

The model relies on diffusivity equations, known in the art, such as the following equations which represent the dimensionless diffusivity equation and serve as the basis for the model:

$$\nabla^2(\Delta p_D) = \frac{\partial \Delta p_D}{\partial \Delta t_D} \qquad \text{Equation 2}$$

$$\Delta t_D = \frac{\eta_1(t - t_{sh})}{x_f^2} \qquad \text{Equation 3}$$

$$\Delta p_{fD}(\Delta t_D) = \frac{2\pi\lambda_1 h_f}{q}(p_{sh} - p_f) \qquad \text{Equation 4}$$

$$\eta_1 = \frac{\lambda_1}{(\phi c_t)_1} \qquad \text{Equation 5}$$

$$\lambda_1 = \frac{k_1}{\mu_1} \qquad \text{Equation 6}$$

$$c_t = c_{fluid} + \frac{3(1-2v)}{\phi E} \qquad \text{Equation 7}$$

Solution to the diffusivity equation is obtained using a confocal elliptical coordinate system. The following equations are further used when dual-mobility exists:

$$\zeta = \frac{\lambda_1}{\lambda_2} \qquad \text{Equation 8}$$

$$\lambda_2 = \frac{k_2}{\mu_2} \qquad \text{Equation 9}$$

$$\kappa = \frac{\eta_1}{\eta_2} \qquad \text{Equation 10}$$

$$\eta_2 = \frac{\lambda_2}{(\phi c_t)_2} \qquad \text{Equation 11}$$

The constants $\zeta$ and $\kappa$ represent the diffusivity and mobility ratio (inner to outer), respectively. These constants enter the expressions for the constant rate terminal solution which are essential in solving the pressure equations.

Two methods are used to solve pressure equations. Prior to fracture closure, the equations are solved using Laplace Transform and after fracture closure, they are solved through numerical integration. The equations are as follows:

$$\Delta p_{fD}(\Delta t_D) = \int_0^{\Delta t_D}\left[1 - C_{tD}\frac{\partial \Delta p_{fD}(\tau_D)}{\partial \tau_D}\right]\frac{\partial \Delta p_{fD}^{cr}(\Delta t_D - \tau_D)}{\partial(\Delta t_D)}d\tau_D 0 < \Delta t_D < \Delta t_D^{Closure} \qquad \text{Equation 12}$$

$$\Delta p_{fD}(\Delta t_D) = \int_0^{\Delta t_D^{Closure}}\left[1 - C_{tD}\frac{\partial \Delta p_{fD}(\tau_D)}{\partial \tau_D}\right]\frac{\partial \Delta p_{fD}^{cr}(\Delta t_D - \tau_D)}{\partial(\Delta t_D)}d\tau_D + \Delta p_{fD}^{cr}(\Delta t_D - \Delta t_D^{Closure}),\ \Delta t_D > \Delta t_D^{Closure} \qquad \text{Equation 13}$$

Total storage is defined as the sum of wellbore and fracture storages as:

$$C_{tD} = \frac{C_t}{2\pi h x_f^2 \phi c} \qquad \text{Equation 14}$$

$$C_t = c_{fluid}V_w + C_f \qquad \text{Equation 15}$$

Equation 13 can also be expressed as $$C_{tD} = C_{fD} + C_{wD} \qquad \text{Equation 16}$$

$$C_{fD} = \frac{C_{fV}}{2\pi h x_f^2 \phi c} \quad \text{Equation 17}$$

$$C_{wD} = \frac{c_{fluid} V_w}{2\pi h x_f^2 \phi c} \quad \text{Equation 18}$$

The integral Equation 20 is most conveniently solved using the Laplace Transform which yields the pressure in the Laplace space as:

$$\Delta\bar{p}_{fD}(s) = \frac{\Delta\bar{p}_{fD}^{cr}(s)}{1 + s^2 C_{fD} \Delta\bar{p}_{fD}^{cr}(s)} \quad \text{Equation19}$$

This equation is then converted to the time space using Stehfest algorithm. Equation 21, however, is computed directly using numerical integration. The terms $\Delta\bar{p}_{fD}^{cr}$ (s) and $\Delta p_{fD}^{cr}$ in the above equations represent constant terminal rate solutions according to the type of the problem.

In contrast with the non-shrinking fracture modeling only one equation is required to be solved. This is due to the fact that fracture will close gradually and theoretically, it will completely be closed at infinite time. The required equation in this case is:

$$\Delta p_{fD}(\Delta t_D) = \int_0^{\Delta t_D} \left[1 - C_{tD}\left[\Delta p_{fD}(\tau_D)\right] \frac{\partial \Delta p_{fD}(\tau_D)}{\partial \tau_D}\right] \frac{\partial \Delta p_{fD}^{cr}(\Delta t_D - \tau_D)}{\partial(\Delta t_D)} d\tau_D \quad \text{Equation 20}$$

It is noted that for the case where fracture closure is abrupt two separate equations are needed for before and after closure while for a gradual closure only the above equation fully represents the pressure behavior. Total storage is defined as the sum of wellbore and fracture storages.

Separating terms in Equation 20 and integrating yields Equation 21:

$$\Delta p_{fD}(\Delta t_D) = \Delta p_{fD}^{cr}(\Delta t_D) - \int_0^{\Delta t_D} \left[1 - C_{tD}\left[\Delta p_{fD}(\tau_D)\right] \frac{\partial \Delta p_{fD}(\tau_D)}{\partial \tau_D}\right] \frac{\partial \Delta p_{fD}^{cr}(\Delta t_D - \tau_D)}{\partial(\Delta t_D)} d\tau_D$$

One difference with the previous solutions is the fracture storage $C_{tD}$ is not constant and varies depending on the pressure level in the fracture. This variation of the fracture storage coefficient with pressure depends on the level of decrease in fracture height and length.

The above equation is solved by a discretization scheme given. In a preferred procedure, solution at any time-step is calculated using the solutions at previous time-steps while the fracture storage constant depends on pressure and gradually approaches zero only at very late times. In the first few time-steps, however, the calculation is performed by means of "exact" Laplace Transform performed on Equation 20 which yields the pressure function in the Laplace space as expressed in Equation 19.

An elliptical coordinate system is employed with the fracture and water front locations mapped. The injection fluid to reservoir fluid contact position is calculated using a selected equation.

Fracture Compliance is the inverse of Fracture Stiffness; whereas, Fracture Stiffness relates the net pressure in the fracture to the average fracture width. The Fracture Storage Constant relates the change in fracture volume to the change in the net pressure within the fracture. Equations for Fracture Compliance and Fracture Constants are given below for three main fracture types:

$$C_f = \frac{w}{p_{net}} \quad \text{Equation 22}$$

$$C_f^{PKN} = \frac{\pi}{2} \frac{(1 - v^2)}{E} h_f \quad \text{Equation 23}$$

$$C_f^{CGK} = \pi \frac{(1 - v^2)}{E} x_f \quad \text{Equation 24}$$

$$C_f^{Elliptical} = \frac{8}{3} \frac{(1 - v^2)}{E} \frac{\min(h_f, 2x_f)}{E(m)} \quad \text{Equation 25}$$

Fracture Storage Equations are as follows:

$$C_{fV} = \frac{\partial V_f}{\partial p_f} \quad \text{Equation 26}$$

$$C_{fV}^{PKN} = \pi \frac{(1 - v^2)}{E} h_f^2 x_f \quad \text{Equation 27}$$

$$C_{fV}^{CGK} = 2\pi \frac{(1 - v^2)}{E} h_f x_f^2 \quad \text{Equation 28}$$

$$C_{fV}^{Elliptical} = \frac{2\pi}{3} \frac{(1 - v^2)}{E} \frac{\min(h_f, 2x_f)}{E(m)} h_f x_f \quad \text{Equation 29}$$

$$m = 1 - \left[\min\left(\frac{h_f}{2x_f}, \frac{2x_f}{h_f}\right)\right] \quad \text{Equation 30}$$

For finite conductivity fractures, each fracture is assigned a finite conductivity value while the pressure in the fracture is no longer uniform. The corresponding equation (in Laplace space) to solve for the pressure change in a closing finite-conductivity fracture is as follows (Reference 2):

$$\frac{\partial^2 \overline{p_{fD}}(\eta, s)}{\partial \eta^2} + \frac{2}{F_{CD}} \cdot \frac{\partial \overline{p_D}(\xi, \eta', s)}{\partial \xi}\bigg|_{\xi=\xi_w} = -\frac{\pi}{F_{CD} \cdot s} \cdot \delta \cdot \left(\frac{\pi}{2} - \eta\right) \quad \text{Equation 31}$$

where: $P_{fD}$ is the pressure in the fracture, and $P_D$ ($\xi$=0, $\eta$) is the pressure in the formation adjacent to the fracture and $$F_{CD} = \frac{k_f}{k} \cdot \frac{w_f}{x_f} \quad \text{Equation 32}$$

The fracture skin is considered as an elliptical shaped damage zone on the fracture face. The following equations account for the effect of fracture skin whereas pressure drop is taken between the pressure in the fracture and the adjacent formation.

$$p_{fD}(\eta) = p_D(\xi = 0, \eta) - \text{Skin} * \frac{\partial p_D}{\partial \xi} @ \xi = 0 \quad \text{Equation 33}$$

where the fracture face skin is given by $$\text{Skin} = \frac{k}{k_e} \cdot \frac{b_0}{x_f} \qquad \text{Equation 34}$$

and $k_e$ and $b_0$ are the permeability and maximum thickness, respectively, of the external filter cake.

The dimensionless fracture storage coefficient $C_{fD}$ at any pressure $\Delta p$ is expressed directly in terms of the initial fracture storage coefficient $C_{fD}^0$ at the moment of the start of fracture shrinkage (at which moment in time the net pressure is given by $\Delta p^0$ (Reference 3). Thus we have:

$$C_{fD}(\Delta p) = C_{fD}^0 * \frac{\dfrac{dV_{fracture}}{d\Delta p_{(\Delta p=\Delta p)}}}{\dfrac{dV_{fracture}}{d\Delta p_{(\Delta p=\Delta p^0)}}} \qquad \text{Equation 35}$$

By using Equation 16, the initial fracture storage coefficient is defined as $$C_{fD}^0 = \frac{C_f}{2\pi h x_f^2 \phi c} \qquad \text{Equation 36}$$

where h represents the injection zone height.

The derivatives of fracture volume with respect to fracture pressure can be derived using the standard expressions of fracture volume for standard types of fracture geometries considered here. In particular, these derivatives depend on fracture height and fracture length. If variation of fracture height and length with respect to pressure is known, the ratio on the right hand side of Equation 37 is easily computed.

It is assumed that a fracture is initiated in the injection layer with thickness h and stress $\sigma_i$ and then penetrated into the upper and lower containment layers. After shut-in, the fracture shrinks from the higher stress zones during closure. The problem is symmetric where stresses in the upper and lower containment layers are equal to $\sigma_c$ so that $\sigma_c$-$\sigma_i$ represents stress contrast between the injection and containment layers. Analytical solution for the depth of penetration is known in the art, for example, using the two-dimensional linear-elastic assumptions in which the stress intensity factors at each end of the fracture is found by:

$$K_{IC} = 2(\sigma_c - \sigma_i)\sqrt{\frac{h_f}{2\pi}}\sin^{-1}\left(\frac{h}{h_f}\right) + (p - \sigma_c)\sqrt{\frac{\pi h_f}{2}} \qquad \text{Equation 37}$$

where $h_f$ is the fracture height, p is the pressure required to propagate the fracture into the barrier zones, and $K_{IC}$ represents the formation critical stress intensity factor (fracture toughness). The above equation can be solved numerically to determine fracture height at any fracture pressure. In the current version of the tool the fracture toughness is neglected so that input of this parameter is not required.

The above equations are used in conjunction with Equation 37 to consider the effect of height shrinkage on the pressure transient. The following dimensionless stress contrast ratio is also defined to show the effect of stress contrast:

$$S_D = \frac{2\pi kh}{q\mu} * S \qquad \text{Equation 38}$$

where $S=\sigma_c$-$\sigma_i$ is the stress contrast as described above.

Furthermore, the dimensionless ratio $p_{net}^0/S$ is defined to represent how far a fracture has penetrated into the adjacent higher stress zones. The term $p_{net}^0$ represents the net pressure at which both upward and downward fracture shrinkage start. As stated in Reference 3, for post-shut-in net pressures below this value the fracture has started to shrink.

The post-shut-in length recession is based qualitatively on the following equation:

$$L(\Delta p_D) = L_{shut-in} * \left(1 - \frac{\Delta p_D^0 - \Delta p_D}{\text{delpat}}\right) \qquad \text{Equation 39}$$

where $$\Delta p_D \le \Delta p_D^0,\ \Delta p_D^0 - \Delta p_D \le \text{delpat} \qquad \text{Equation 40}$$

$\Delta p_D^0$ is the dimensionless pressure at which lengthwise shrinkage starts and the parameter "delpat" characterizes the rate of lengthwise fracture shrinkage. In other words, it characterizes how fast the fracture recedes. In the limit, "delpat" approaches zero so that fracture closure will be abrupt. Again, the above equations are used in conjunction with Equation 37 to consider the effect of length shrinkage on the pressure transient.

Nomenclature for the above equations is as follows:

$b_0$—Maximum Thickness of External Filtercake on Fracture Face $C_f$—Fracture Compliance $C_{fV}$—Fracture Storage Constant $c_t$—Total Compressibility E—Young's Modulus E(m)—Complete Elliptical Integral $2^{nd}$ kind $h_f$—Fracture Height $k_{1,2}$—Permeability of Inner, Outer Zone $k_e$—External Filtercake Permeability $k_f$—Fracture Permeability $p_{net}$—Net Pressure in the Fracture $p_D$—Dimensionless Formation Pressure $P_f$,—Pressure in the Fracture $p_{fD}$—Dimensionless Pressure in Fracture $p_f^{cr}$—Constant Rate Solution for Infinite Conductivity Fracture $p_{fD}^{cr}$—Dimensionless Constant Rate Solution for Infinite Conductivity Fracture $p_{sh}$—Pressure in the Fracture at Shut-in q—Injection Rate $R_f$—Fracture Radius T—Elapsed Time $t_{sh}$—Shut-in Time s—Laplace Time Variable S—stress Contrast between Injection and containment Layers Skin—External Filtercake Skin $S_{ro}$—Residual Oil Saturation $S_{wi}$—Initial Water Saturation w—Average Fracture Width $V_I$—Injected Volume $x_f$—Fracture Length v—Poisson's Ratio $\zeta_{1,2}$—Diffusivity of Inner, Outer Zone $\lambda_{1,2}$—Mobility of Inner, Outer Zone $\mu_{1,2}$—Viscosity of Inner, Outer Zone $\varphi$—Porosity $\xi_0$—Location of Mobility Discontinuity (Elliptical Coordinate)

The disclosed methods are used to extract key formation data from a pressure fall-off test by forward modeling. In addition, it justifies formation data measured in lab tests and can be used to interpret well test from fractured water-injection well.

The following disclosure is provided in support of the methods claimed or which may be later claimed. Specifically, this support is provided to meet the technical, procedural, or substantive requirements of certain examining offices. It is expressly understood that the portions or actions of the methods can be performed in any order, unless specified or otherwise necessary, that each portion of the method can be repeated, performed in orders other than those presented, that additional actions can be performed between the enumerated actions, and that, unless stated otherwise, actions can be omitted or moved. Those of skill in the art will recognize the various possible combinations and permutations of actions performable in the methods disclosed herein without an explicit listing of every possible such combination or permutation. It is explicitly disclosed and understood that the actions disclosed, both herein below and throughout, can be performed in any order (xyz, xzy, yxz, yzx, etc.) without the wasteful and tedious inclusion of writing out every such order.

The following U.S. patents and patent application Publications are incorporated herein by reference in their entirety for all purposes: Provisional Patent Application Ser. No. 62/010,911, filed Jun. 12, 2014, and Provisional Patent Application Ser. No. 61/862,474, filed Aug. 5, 2013. The following references are incorporated herein in their entirety for all purposes by reference: Koning, E., Niko, H., "Fractured Water-Injection Wells: A Pressure Falloff Test for Determining Fracture Dimensions", SPE 14458, 60$^{th}$ Annual Technical Conference and Exhibition of the Society of Petroleum Engineers, Las Vegas, Nev., Sep. 22-25, 1985; Van den Hoek, P., "Pressure Transient Analysis in Fractured Produced Water Injection Wells", SPE 77946, SPE Asia Pacific Oil & Gas Conference and Exhibition, Melbourne, Australia, 8-10 Oct. 2002; Van den Hoek, P. J., "Dimensions and Degree of Containment of Waterflood-Induced Fractures From Pressure-Transient Analysis", SPE 84289, Journal SPE Reservoir Evaluation & Engineering, Volume 8, Number 5, Date October 2005; Simonson, E. R., Abou-Sayed, A. S., and Clifton, R. J., "Containment of Massive Hydraulic Fractures", SPE Journal, Volume 18, Number 1, February 1978; Economides, M., Oligney, R., Valko, P., Unified Fracture Design: Bridging the Gap Between Theory and Practice, Orsa Press, Alvin, Tex., 2002, pp. 104-105; Obut, S. T., Ertekin, T., "A Composite System Solution in Elliptic Flow Geometry", SPE Formation Evaluation, September 1987; Kucuk, F., Brigham, W. E., "Transient Flow in Elliptical Systems", Society of Petroleum Engineers Journal, December 1979; and Riley, M. F., Brigham, W. E., Home, R. N., "Analytic Solutions for Elliptical Finite-Conductivity Fractures", SPE 22656, 66$^{th}$ Annual Technical Conference and Exhibition of the Society of Petroleum Engineers, Dallas, Tex., Oct. 6-9, 1991.

Further, disclosed herein are the following. Use of pressure transient analysis during the fall-off period at the end of an injection event (pressure test or injection operation) to provide an estimate of stimulated reservoir volume in fractured tight reservoirs. By determining the extent of the inner and outer mobility zones where the permeability difference between the two zones is due to stimulating fracturing of the inner zone and the presence of a discrete but distributed fracture network. An algorithm and a method to generate type-curves that represent the pressure transient behavior of a fractured injector during shut in, fracture closure and post closure response. Estimate of in situ stress contrast between the injection horizon and surrounding formations (above and below) during shut in period. A method to calculate fracture length, height and out of zone vertical excursion following an injection-fall off test or operation. A method of doing so using a genetic algorithm or other convergence algorithm. Use of software and/or a computer, computers, computer device, to do any of these. Use of real-time data in conjunction with any of these. Enabling any of the above via cloud computing. Allows optimization/minimization of the fracture footprint for future wells in the field thus reducing the environmental impact and potential negative results of fracturing. Enables operator to establish the containment of created hydraulic fractures and minimize risk of loss of containment of frac fluids or of reservoir hydrocarbons. A pressure transient analysis method of calculating the stimulated reservoir volume of a well which has been hydraulically fractured. The method where the well is used for injection or sequestration of wastes. The method where the well is used for enhanced oil recovery through injection (such as water-flooding or steam-flood) from depleted reservoirs or new and/or old medium, light of heavy oil fields. The method where the well is used for production of oil, gas, water, from conventional or unconventional hydrocarbon resources such as shale gas, shale oil and oil shale. A method of calculating the stimulated reservoir volume of a well which has been hydraulically fractured using pressure transient analysis. The method where the well is used for injection or sequestration of waste. The method where the well is used for enhanced oil recovery through injection (such as water-flooding). The method where the well is used for production of oil, gas, water, or other materials. An objective of the present disclosure is to present a more realistic and accurate estimation of the stimulated reservoir volume and determination of reservoir and fracture parameters through computational simulation based analyses of pressure transients and their derivatives during a pressure fall of test following an injection operation which involves hydraulic fracturing in a well. The utility of the disclosure is greatest for reservoirs where the increase in the inner zone permeability, transmissibility, or mobility is primarily due to hydraulic fracturing (such as with gas production from fractured shale). The disclosure also provides information about the dimensions of the hydraulic fractures, whether created by the operation or pre-existing fractures activated by the operation, and the stress contrasts between injection and containment layers. The disclosure correctly interprets the closing and shrinking (in length and or height) fracture signature. The disclosure correctly identifies the conductivity of the fracture. The disclosure also determines the degree of the containment of the main created hydraulic fracture to enable the operator to use fracture conditions which assure the containment of the fracture and the injected fluid used to create the fracture within the target zone. The fracture created in a well can be used for enhancing the productivity of the well, sequestration of solid waste, or injection of fluid for disposal or reservoir pressure support. The disclosure is executable using a software program to simulate input parameters which control the shape of type-curves of pressure response and its derivative and to match these resultant type-curves to the actual field derived data. The software program operates on a processor based computational system. The software program can use a genetic algorithm or optimization technique to facilitate the rapid simulation of many input parameters to make the type curve match. The software program uses pressure transient data in real-time as it is acquired or after the fact. The data is stored on physical media readable by the computer upon which the software is installed or can be stored on a different computer and the software can read the data over a network or via the internet.

Support for Computer Method claims is provided here. Definitions include the following. Computer/Computerized System: The system, methods, and other embodiments according to the present disclosure include computerized systems requiring the performance of one or more methods or steps performed on or in association with one or more computer.

The term computer as used herein and in the claims is not and is not intended to be a means-plus-function term or element. A computer is a programmable machine having two principal characteristics, namely, it responds to a set of instructions in a well-defined manner and can execute a pre-recorded list of instructions (e.g., a program). A computer according to the present disclosure is a device with a processor and a memory. For purposes of this disclosure, a computer includes a server, a personal computer, (i.e., desktop computer, laptop computer, netbook), a mobile communications device, such as a mobile "smart" phone, and devices providing functionality through internal components or connection to an external computer, server, or global communications network (such as the internet) to take direction from or engage in processes which are then delivered to other system components.

Those of skill in the art recognize that other devices, alone or in conjunction with an architecture associated with a system, can provide a computerized environment for carrying out the methods disclosed herein. The method aspects of the disclosure are computer implemented and, more particularly, at least one step is carried out using a computer.

General-purpose computers include hardware components. A memory or memory device enables a computer to store data and programs. Common storage devices include disk drives, tape drives, thumb drives, and others known in the art. An input device can be a keyboard, mouse, hand-held controller, remote controller, a touchscreen, and other input devices known in the art. The input device is the conduit through which data and instructions enter a computer. An output device is a display screen, printer, or other device letting the user sense what the computer has accomplished, is accomplishing, or is expected to accomplish. A central processing unit (CPU) is the "brains" of the computer and executes instructions and performs calculations. For example, typical components of a CPU are an arithmetic logic unit (ALU), which performs arithmetic and logical operations and a control unit (CU) which extracts instructions from memory, decodes and executes them, calling on the ALU when necessary. The CPU can be a micro-processor, processor, one or more printed circuit boards (PCBs). In addition to these components, others make it possible for computer components to work together or in conjunction with external devices and systems, for example, a bus to transmit data within the computer, ports for connectivity to external devices or data transmission systems (such as the internet), wireless transmitters, read and read-write devices, etc., such as are known in the art.

A server is a computer or device on a network that manages network resources. There are many different types of servers, including remote, live and network access servers, data servers, member servers, staging servers, etc. A server can be hardware and/or software that manages access to a centralized resource or service in a network. For purposes of this disclosure, the term "server" also includes "virtual servers" which can be hosted on actual servers.

A computer network or data network is a communications network allowing computers to exchange data, with networked devices passing data to each other on data connections. Network devices that originate, route, and terminate data are called nodes. The connections (links) between nodes are established using wire or wireless media. Nodes can include hosts, such as PCs, phones, servers, and networking hardware. Devices are networked together when one device is able to exchange information with the other device whether or not they have a direct connection to each other. Computer networks support applications such as access to the World Wide Web (WWW) or internet, shared use of application and storage servers, printers, and use of email and instant messaging applications. Computer networks differ in the physical media to transmit signals, protocols to organize network traffic, network size, topology, and organizational intent.

A (control) gateway is a network node that acts as an entrance to another network. In homes, the gateway is the ISP (internet service provider) that connects the user to the internet. In enterprises, the gateway node often acts as proxy server and firewall. The gateway is also associated with a router, which uses headers and forwarding tables to determine where packets are sent, and a switch, which provides the actual path for the packet in and out of the gateway.

A (control) gateway for the particular purpose of connection to identified cloud storage, often called a cloud storage gateway, is a hardware-based and/or software-based appliance located on the customer premises that serves as a bridge between local applications and remote cloud-based storage and are sometimes called cloud storage appliances or controllers. A cloud storage gateway provides protocol translation and connectivity to allow incompatible technologies to communicate transparently. The gateway can make cloud storage appear to be an NAS (network attached storage) filer, a block storage array, a backup target, a server, or an extension of the application itself. Local storage can be used as a cache for improved performance. Cloud gateway product features include encryption technology to safeguard data, compression, de-duplication, WAN optimization for faster performance, snapshots, version control, and data protection.

A "bridge" connects two (local) networks, often connecting a local network using an internet router.

A router forwards data packets along networks and is connected to at least two networks, commonly two LANs, WANs, or a LAN and its ISP's network. Routers are located at "gateways," the places where two or more networks connect. Routers use headers and forwarding tables to determine paths for forwarding packets and use protocols to communicate with each other to configure a route between hosts.

The disclosure includes one or more databases for storing information relating to aspects of the disclosure. The information stored on a database can, for example, be related to a private subscriber, a content provider, a host, a security provider, etc. One of ordinary skill in the art appreciates that "a database" can be a plurality of databases, each of which can be linked to one another, accessible by a user via a user interface, stored on a computer readable medium or a memory of a computer (e.g., PC, server, etc.), and accessed by users via global communications networks (e.g., the internet) which may be linked using satellites, wired technologies, or wireless technologies.

In computer networking, "cloud computing" is used to describe a variety of concepts involving a large number of computers connected through a network (e.g., the Internet). The phrase is often used in reference to network-based services, which appear to be provided by real server hardware, but which are in fact served by virtual hardware, simulated by software running on one or more machines. Virtual servers do not physically exist and can therefore be moved around, scaled up or down, etc., without affecting the user.

In common usage, "the cloud" is essentially a metaphor for the internet. "In the cloud" also refers to software, platforms, and infrastructure sold "as a service" (i.e., remotely through the internet). The supplier has actual servers which host products and services from a remote location, so that individual users do not require servers of their own. End-users can simply log-on to the network, often without installing anything, and access software, platforms, etc. Models of cloud computing service are known as software as a service, platform as a service, and infrastructure as a service. Cloud services may be offered in a public, private, or hybrid networks. Google, Amazon, Oracle Cloud, and Microsoft Azure are well-known cloud vendors.

Software as a service (SaaS) is a software delivery model in which software and associated data are centrally hosted on the Cloud. Under SaaS, a software provider licenses a software application to clients for use as a service on demand, e.g., through a subscription, time subscription, etc. SaaS allows the provider to develop, host, and operate a software application for use by clients who just need a computer with internet access to download and run the software application and/or to access a host to run the software application. The software application can be licensed to a single user or a group of users, and each user may have many clients and/or client sessions.

Typically, SaaS systems are hosted in datacenters whose infrastructure provides a set of resources and application services to a set of multiple tenants. A "tenant" can refer to a distinct user or group of users having a service contract with the provider to support a specific service. Most SaaS solutions use a multi-tenant architecture where a single version of the application, having a single configuration (i.e., hardware, operating system, and network) is used by all tenants (customers). The application can be scaled by installation on several machines. Other solutions can be used, such as virtualization, to manage large numbers of customers. SaaS supports customization in that the application provides defined configuration options allowing each customer to alter their configuration parameters and options to choose functionality and "look and feel."

SaaS services are supplied by independent software vendors (ISVs) or Application Service Providers (ASPs). SaaS is a common delivery model for business applications (e.g., office and messaging, management, and development software, and for accounting, collaboration, management information systems (MIS), invoicing, and content management.

SaaS is an advantage to end-users in that they do not need to provide hardware and software to store, back-up, manage, update, and execute the provided software. Since SaaS applications cannot access the user's private systems (databases), they often offer integration protocols and application programming interfaces (API) such as http (hypertext transfer protocol), REST (representational state transfer), SOAP (simple object access protocol), and JSON (JavaScript Object Notation).

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

As used herein, the words "consisting essentially of," and all grammatical variations thereof are intended to limit the scope of a claim to the specified materials or steps and those that do not materially affect the basic and novel characteristic(s) of the claimed disclosure.

The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

While the foregoing written description of the disclosure enables one of ordinary skill to make and use the embodiments discussed, those of ordinary skill will understand and appreciate the existence of variations, combinations, and equivalents of the specific embodiments, methods, and examples herein. The disclosure should therefore not be limited by the above described embodiments, methods, and examples. While this disclosure has been described with reference to illustrative embodiments, this description is not intended to be construed in a limiting sense. Various modifications and combinations of the illustrative embodiments as well as other embodiments of the disclosure will be apparent to persons skilled in the art upon reference to the description. It is, therefore, intended that the appended claims encompass any such modifications or embodiments.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure. The various elements or steps according to the disclosed elements or steps can be combined advantageously or practiced together in various combinations or sub-combinations of elements or sequences of steps to increase the efficiency and benefits that can be obtained from the disclosure. It will be appreciated that one or more of the above embodiments may be combined with one or more of the other embodiments, unless explicitly stated otherwise. Furthermore, no limitations are intended to the details of construction, composition, design, or steps herein shown, other than as described in the claims.

It is claimed:

1. A method of operating an injection well having a wellbore extending through a subterranean zone, the subterranean zone bounded by an adjacent upper [confinement] *containment* zone and an adjacent lower containment zone, the method comprising:

pumping fluids having a first set of fluid properties into the subterranean zone at a first pressure above fracture pressure;

hydraulically fracturing the *subterranean* zone;

shutting-in the *injection* well and allowing pressure fall-off;

measuring pressure transient data after shutting-in the *injection* well and during pressure fall-off;

pumping fluids having a second set of fluid properties at a second pressure above fracture pressure, wherein at least one of the second set of fluid properties or the second pressure is different than the first set of fluid properties or first pressure, and the second set of fluid properties or second pressure determined by a computer-implemented method comprising:

inputting to a computer program stored in a non-transitory memory and executed by a computer, pressure and time data from the pressure transient data measured after shut-in and during fall-off;

calculating, using the computer program, type curves based on the input pressure transient data, the type curves having associated curve parameters;

iteratively performing at least one curve-fitting algorithm using the computer program, the computer program determining a mathematically-described, calculated type curve which estimates the type curve to a pre-selected accuracy;

calculating, using the computer program, a stimulated reservoir volume;

determining, using the computer program, stress contrasts between the subterranean zone and at least one of [an] *the* adjacent upper and *adjacent* lower containment zones; and conducting, using the computer program, iterative, computer-modelled fracture simulations and calculating a maximum injection pressure at which a corresponding maximum computer-modelled fracture does not breach at least one of the *adjacent* upper and *adjacent* lower containment zones.

2. The method of claim 1, wherein the second set of fluid properties or second pressure is determined by the computer-implemented method further comprising calculating a waterflood design or a maximizing fracture extent using the stress [contrast] *contrasts*.

3. The method of claim 2, wherein the second set of fluid properties or second pressure above fracture pressure are determined by the waterflood design or maximizing fracture extent.

4. The method of claim 1, wherein the second pressure is determined by using the calculated maximum injection pressure at which a corresponding maximum computer-modelled fracture does not breach at least one of the *adjacent* upper and *adjacent* lower containment zones.

5. The method of claim 1, wherein the second set of fluid properties or second pressure is determined by the computer-implemented method further comprising isolating, using the computer program, a water hammer effect from the pressure transient data.

6. The method of claim 1, wherein the second set of fluid properties or second pressure is determined by the computer-implemented method further comprising calculating a maximum contained volume in the subterranean zone, and maximum pressure limits and injection fluid properties which will not exceed the maximum contained volume.

*7. A method of operating an injection well having a wellbore extending through a subterranean injection zone, the subterranean injection zone bounded by an adjacent upper containment zone and an adjacent lower containment zone, the method comprising:*

*in an injection operation, pumping fluids having a first set of fluid properties into the subterranean injection zone at a first pressure above fracture pressure;*

*hydraulically fracturing the subterranean injection zone;*

*shutting-in the injection well and allowing pressure fall-off;*

*measuring pressure transient data after shutting-in the injection well and during pressure fall-off;*

*inputting to a computer program stored in a non-transitory memory and executed by a computer, pressure and time data from the pressure transient data measured after shut-in and during fall-off; and*

*determining, using the pressure transient data and computer program, a maximum injection pressure limit, for the fluids having the first set of fluid properties, to assure containment of the fluids in the subterranean injection zone.*

*8. The method of claim 7, further comprising determining a maximum injection pressure to create a maximum fracture without breach of the adjacent upper containment zone or adjacent lower containment zone.*

*9. The method of claim 7, further comprising applying the maximum injection pressure limit before resumption of the injection operation.*

*10. The method of claim 7, further comprising determining, using the computer program, stress contrasts between the subterranean injection zone and the adjacent upper and adjacent lower containment zones, and utilizing the stress contrasts to determine the maximum injection pressure limit.*

*11. The method of claim 7, further comprising determining an additional injection pressure, above the first pressure, the subterranean injection zone can sustain before fracturing either of the adjacent upper or adjacent lower containment zones.*

*12. The method of claim 7, wherein inputting the pressure transient data is performed in real time.*

*13. The method of claim 7, further comprising calculating, using the computer program, type curves based on the input pressure transient data, the type curves having associated curve parameters.*

*14. The method of claim 7, further comprising conducting, using the computer program, iterative, computer-modelled fracture simulations and calculating the maximum injection pressure limit at which a corresponding maximum computer-modelled fracture does not breach at least one of the adjacent upper and adjacent lower containment zones.*

*15. A method of operating an injection well having a wellbore extending through a subterranean injection zone, the subterranean injection zone bounded by an adjacent upper containment zone and an adjacent lower containment zone, the method comprising:*

*an injection operation, pumping fluids having a first set of fluid properties into the subterranean injection zone at a first pressure above fracture pressure;*

*hydraulically fracturing the subterranean injection zone;*

*shutting-in the injection well and allowing pressure fall-off;*

*measuring pressure transient data after shutting-in the injection well and during pressure fall-off;*

*inputting to a computer program stored in a non-transitory memory and executed by a computer, pressure and time data from the pressure transient data measured after shut-in and during fall-off;*

*determining, using the pressure transient data and computer program, stress contrasts between the subterranean injection zone and the adjacent upper containment zone and adjacent lower containment zone.*

*16. The method of claim 15, further comprising, utilizing the stress contrasts, determining a maximum injection pressure limit to assure containment of the fluids in the subterranean injection zone.*

*17. The method of claim 16, further comprising applying the maximum injection pressure limit before resumption of the injection operation.*

*18. The method of claim 17, further comprising determining an additional injection pressure, above the first pressure, the subterranean injection zone can sustain before fracturing either of the adjacent upper or adjacent lower containment zones, and applying the additional injection pressure upon resumption of the injection operation.*

*19. A method of operating an injection well having a wellbore extending through a subterranean injection zone, the subterranean injection zone bounded by an adjacent upper containment zone and an adjacent lower containment zone, the method comprising:*

*in an injection operation, pumping fluids having a first set of fluid properties into the subterranean injection zone at a first pressure above fracture pressure;*

*hydraulically fracturing the subterranean injection zone;*

*shutting-in the injection well and allowing pressure fall-off;*

*measuring pressure transient data after shutting-in the injection well and during pressure fall-off;*

*inputting to a computer program stored in a non-transitory memory and executed by a computer, pressure and time data from the pressure transient data measured after shut-in and during fall-off;*

*determining, using the pressure transient data and computer program, fracture penetration into one of the adjacent upper or adjacent lower containment zones.*

*20. The method of claim 19, further comprising determining a maximum injection pressure limit, for the fluids having the first set of fluid properties, to assure containment of the fluids in the subterranean injection zone.*

*21. The method of claim 20, further comprising applying the maximum injection pressure limit upon resumption of the injection operation.*

*22. A method of operating an injection well having a wellbore extending through a subterranean injection zone, the subterranean injection zone bounded by an adjacent upper containment zone and an adjacent lower containment zone, the method comprising:*

*in an injection operation, pumping fluids having a first set of fluid properties into the subterranean injection zone at a first pressure above fracture pressure;*

*hydraulically fracturing the subterranean injection zone;*

*shutting-in the injection well and allowing pressure fall-off;*

*measuring pressure transient data after shutting-in the injection well and during pressure fall-off;*

*inputting to a computer program stored in a non-transitory memory and executed by a computer, pressure and time data from the pressure transient data measured after shut-in and during fall-off;*

*determining, using the pressure transient data and computer program, a maximum contained volume in the subterranean injection zone, and determining injection pressure limits and fluid properties to reach the maximum contained volume upon resumption of the injection operation.*

*23. The method of claim 22, further comprising applying the injection pressure limits and fluid properties upon resumption of the injection operation.*

*24. A method of operating an injection well having a wellbore extending through a subterranean injection zone, the subterranean injection zone bounded by an adjacent upper containment zone and an adjacent lower containment zone, the method comprising:*

*in an injection operation, pumping fluids having a first set of fluid properties into the subterranean injection zone at a first pressure above fracture pressure;*

*hydraulically fracturing the subterranean injection zone, an inner mobility zone and an outer mobility zone defined radially around the wellbore, the inner and outer mobility zones having differing relative permeabilities;*

*shutting-in the injection well and allowing pressure fall-off;*

*measuring pressure transient data after shutting-in the injection well and during pressure fall-off;*

*inputting to a computer program stored in a non-transitory memory and executed by a computer, pressure and time data from the pressure transient data measured after shut-in and during fall-off;*

*determining, using the pressure transient data and computer program, a transition from the inner mobility zone to the outer mobility zone.*

*25. The method of claim 24, further comprising determining a stimulated reservoir volume.*

*26. The method of claim 24, further comprising determining fracture penetration into the adjacent upper or adjacent lower containment zone.*

*27. The method of claim 24, further comprising determining the length and height of the hydraulic fractures.*

*28. The method of claim 24, further comprising determining the shrinkage of the hydraulic fractures in height, length or both.*

*29. The method of claim 28, further comprising determining the shrinkage rate of the hydraulic fractures.*

* * * * *